US010067530B2

(12) United States Patent
Tazbaz et al.

(10) Patent No.: US 10,067,530 B2
(45) Date of Patent: Sep. 4, 2018

(54) INTEGRATED MULTI-PIVOT HINGE MODULE

(71) Applicant: Microsoft Technology Licensing, LLC, Redmond, WA (US)

(72) Inventors: Errol M. Tazbaz, Bellevue, WA (US); Brian Bitz, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/256,412

(22) Filed: Sep. 2, 2016

(65) Prior Publication Data
US 2018/0067519 A1 Mar. 8, 2018

(51) Int. Cl.
| | | |
|---|---|---|
| *E05D 15/00* | (2006.01) | |
| *G06F 1/16* | (2006.01) | |
| *E05D 3/06* | (2006.01) | |
| *E05D 11/10* | (2006.01) | |
| *E05D 7/12* | (2006.01) | |

(52) U.S. Cl.
CPC ............ *G06F 1/1616* (2013.01); *E05D 3/06* (2013.01); *E05D 7/12* (2013.01); *E05D 11/10* (2013.01); *G06F 1/1637* (2013.01); *G06F 1/1681* (2013.01); *E05D 2007/128* (2013.01); *E05Y 2900/606* (2013.01)

(58) Field of Classification Search
CPC ...... G06F 1/168; G06F 1/1681; G06F 1/1616; G06F 1/1637; G06F 1/547; E05Y 2900/602; E05Y 2900/606; H04M 1/022; H04M 1/0214; H04M 1/0216; E05D 3/12; E05D 3/122; E05D 3/14; E05D 3/16; E05D 3/06; E05D 7/12; E05D 11/06; E05D 11/10; Y10T 16/54038; Y10T 16/5403; Y10T 16/54033; Y10T 16/547; Y10T 16/5474; Y10T 16/5475
See application file for complete search history.

(56) References Cited

U.S. PATENT DOCUMENTS

| | | | | |
|---|---|---|---|---|
| 6,223,393 | B1 * | 5/2001 | Knopf .................. | G06F 1/1681 16/366 |
| 8,170,630 | B2 * | 5/2012 | Murayama ............ | H04M 1/022 16/330 |
| 8,776,319 | B1 * | 7/2014 | Chang .................. | G06F 1/1681 16/303 |
| 9,268,372 | B1 * | 2/2016 | Hsu ...................... | G06F 1/1681 |
| 2007/0117600 | A1 * | 5/2007 | Robertson, Jr. ...... | H04M 1/0216 455/575.3 |

(Continued)

FOREIGN PATENT DOCUMENTS

CN 204553530 U 8/2015

OTHER PUBLICATIONS

"International Search Report and Written Opinion Issued in PCT Application No. PCT/US2017/048772", dated Nov. 27, 2017, 13 Pages.

*Primary Examiner* — Chuck Mah
(74) *Attorney, Agent, or Firm* — Talem IP Law, LLP

(57) ABSTRACT

Technologies are described for a fully integrated multi-pivot hinge module to rotatably secure portions of a computing device. The multi-pivot hinge module includes multiple sequential frames that are radially aligned and configured to control a relative order of opening and closing of each individual frame. The multi-pivot hinge module includes friction, timing and kinematic components for controlling the order of rotation, degree of rotation and increasing stability of the module.

16 Claims, 24 Drawing Sheets

(56) References Cited

U.S. PATENT DOCUMENTS

| | | | |
|---|---|---|---|
| 2010/0232100 A1* | 9/2010 | Fukuma | F16G 13/18 361/679.01 |
| 2012/0137471 A1* | 6/2012 | Kujala | G06F 1/1681 16/382 |
| 2013/0194741 A1* | 8/2013 | Uchiyama | G06F 1/1681 361/679.26 |
| 2014/0126133 A1* | 5/2014 | Griffin | G06F 1/1652 361/679.27 |
| 2014/0174226 A1* | 6/2014 | Hsu | E05D 3/122 74/98 |
| 2014/0196254 A1* | 7/2014 | Song | E05D 3/14 16/302 |
| 2014/0217875 A1* | 8/2014 | Park | H05K 5/0226 312/326 |
| 2014/0245569 A1 | 9/2014 | Cho et al. | |
| 2014/0338483 A1* | 11/2014 | Hsu | F16H 21/44 74/96 |
| 2015/0176317 A1* | 6/2015 | Lee | E05D 3/06 16/251 |
| 2015/0277505 A1* | 10/2015 | Lim | G06F 1/1681 361/679.27 |
| 2016/0132075 A1 | 5/2016 | Tazbaz | |
| 2016/0132076 A1* | 5/2016 | Bitz | G06F 1/1681 361/679.27 |
| 2016/0147267 A1* | 5/2016 | Campbell | G06F 1/1681 361/679.27 |
| 2016/0187935 A1 | 6/2016 | Tazbaz et al. | |
| 2016/0215541 A1 | 7/2016 | Tazbaz et al. | |
| 2016/0224072 A1* | 8/2016 | Huang | E05D 7/06 |
| 2016/0349802 A1* | 12/2016 | Ahn | G06F 1/1641 |

* cited by examiner

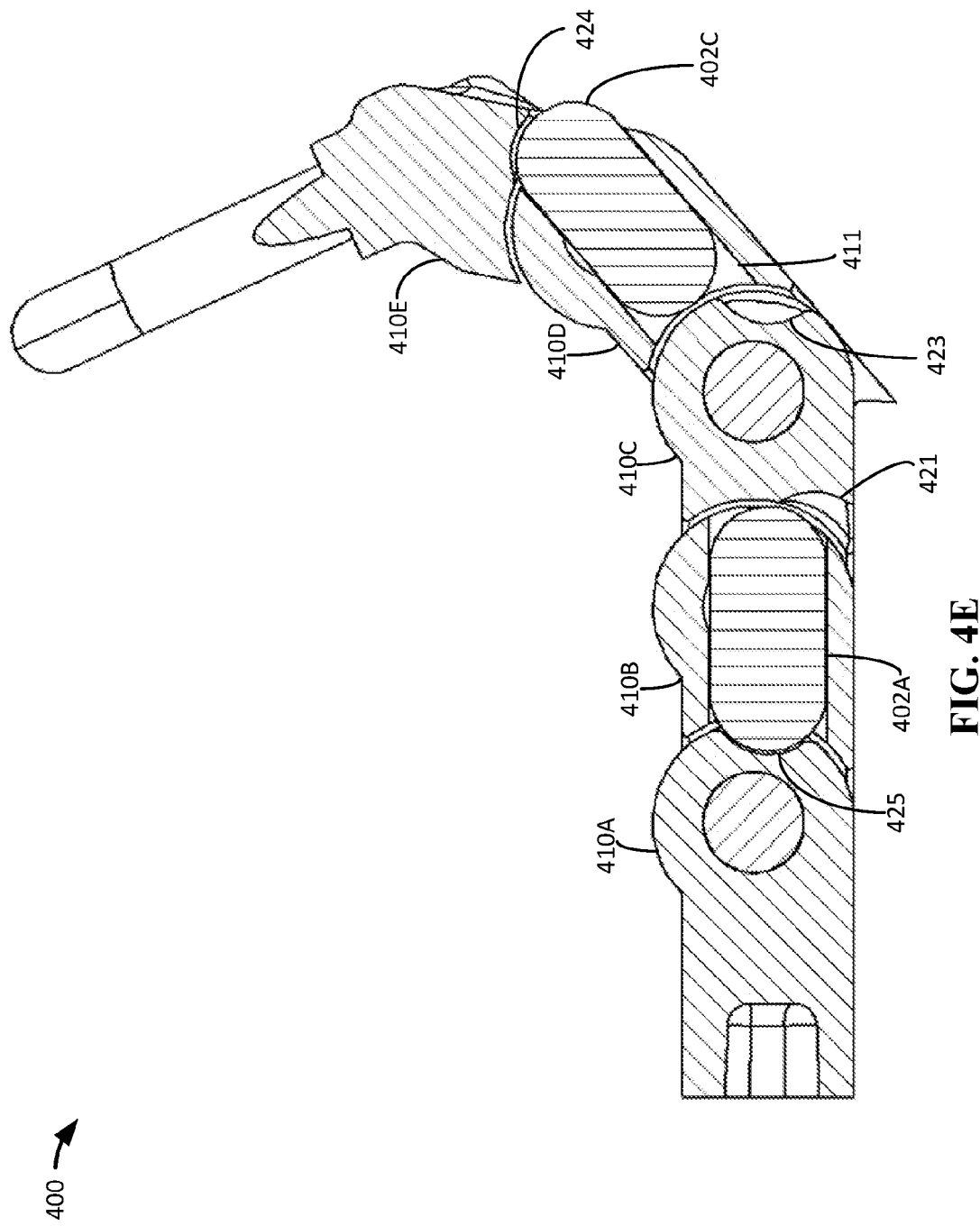

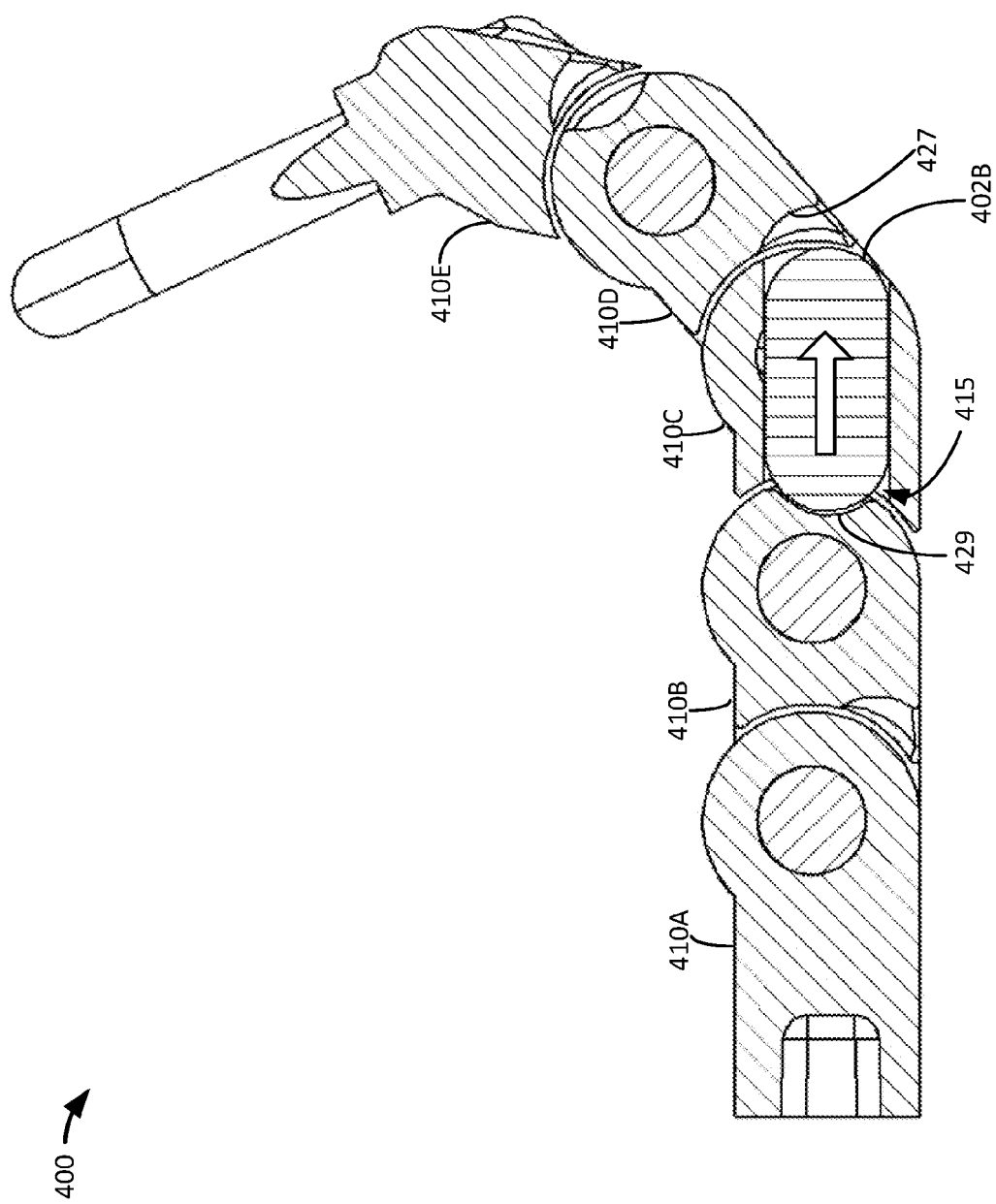

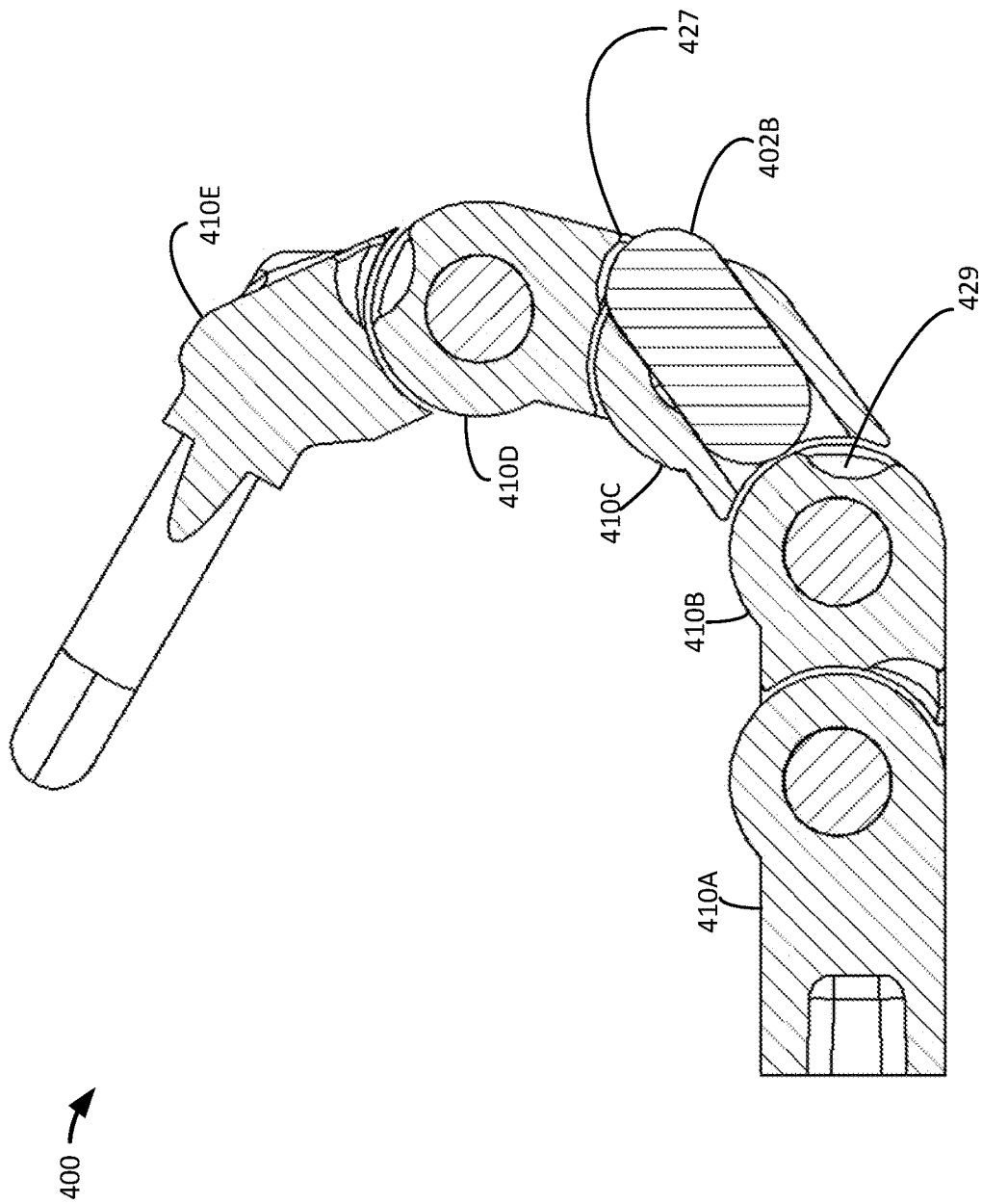

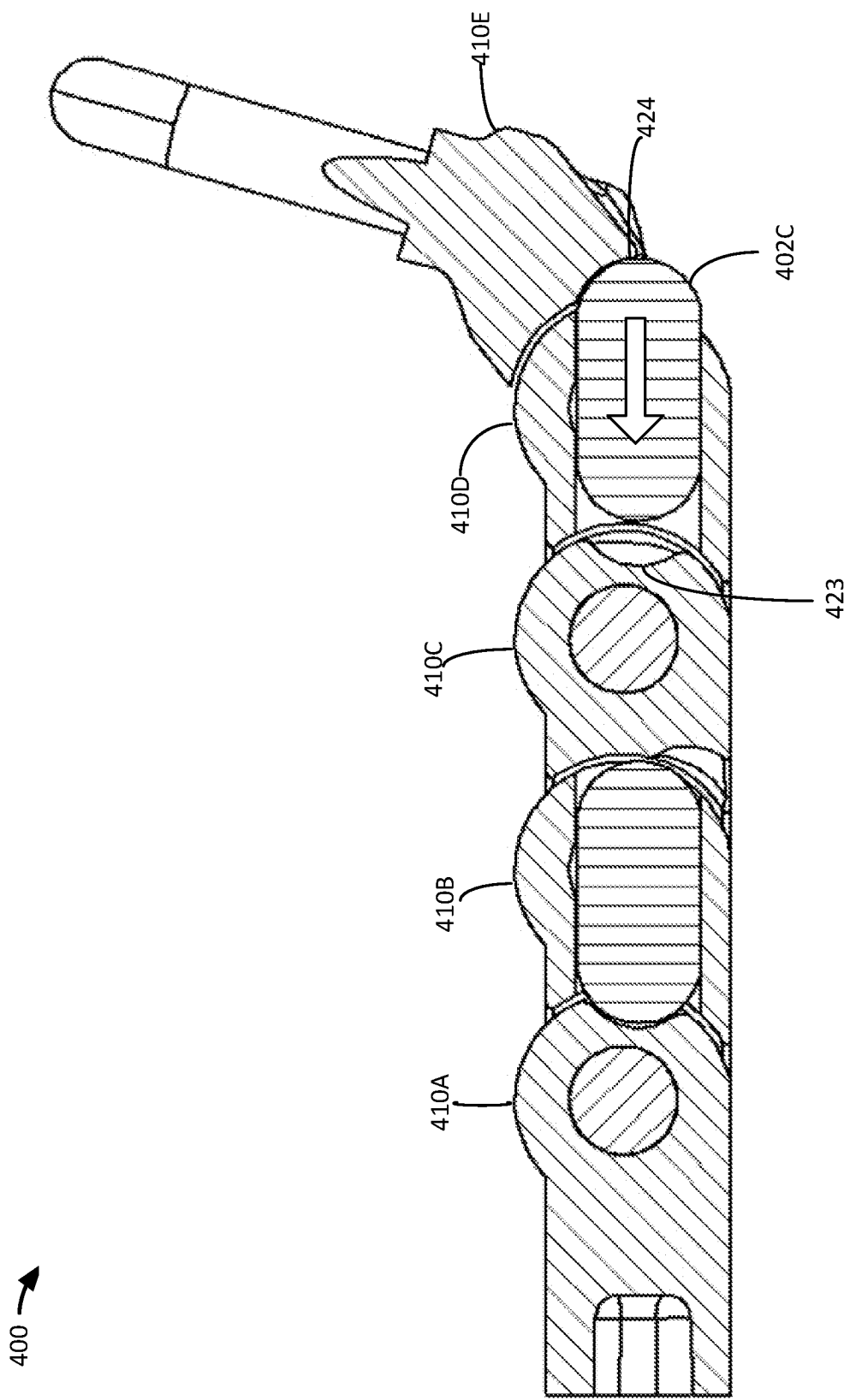

INTEGRATED MULTI-PIVOT HINGE MODULE

BACKGROUND

Some computing devices, such as a tablet or a touch screen device, can be used for a variety of purposes including displaying books, interacting with applications, browsing the Internet, reading email, or other similar activities. For certain applications, more processing power and input capabilities are desired. Input devices, such as keyboards, can be attached to tablet devices to allow additional interactions, such as, editing documents, filling in forms, composing emails, and other similar activities. The attachment of input devices, such as a keyboard, enable tablet-style computing devices to provide the convenience similar to a laptop and enable lap-top style computing devices to have the flexibility similar to a tablet.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

Technologies are described for a fully integrated multi-pivot hinge module to rotatably secure portions of a computing device. The multi-pivot hinge module includes multiple sequential frames that are radially aligned and configured to control a relative order of opening and closing of each individual frame. The multi-pivot hinge module includes a set of radially arranged sequential frames configured to rotate around individual frame axes, each frame including a plurality of kinematic components for controlling a degree of rotation about each frame axis, a set of rotational limiting surfaces interposed between adjacent frames, the set of rotational control elements configured to control a relative sequence of rotation of the individual sequential frames, and a set of friction components integrated with the set of radially arranged sequential frames, the friction components including one or more shafts configured to rotatably secure adjacent frames together defining the individual frame axes of adjacent frames These and other features and advantages will be apparent from a reading of the following detailed description and a review of the appended drawings. It is to be understood that the foregoing summary, the following detailed description and the appended drawings are explanatory only and are not restrictive of various aspects as claimed.

DETAILED DESCRIPTION

The detailed description provided below in connection with the appended drawings is intended as a description of examples and is not intended to represent the only forms in which the present examples may be constructed or utilized. The description sets forth functions of the examples and sequences of steps for constructing and operating the examples. However, the same or equivalent functions and sequences may be accomplished by different examples.

References to "one embodiment," "an embodiment," "an example," "one implementation," "an implementation," "one example," "an example" and the like, indicate that the described embodiment, implementation or example may include a particular feature, structure or characteristic, but every embodiment, implementation or example may not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic may be implemented in connection with other embodiments, implementations or examples whether or not explicitly described.

Numerous specific details are set forth in order to provide a thorough understanding of one or more aspects of the described subject matter. It is to be appreciated, however, that such aspects may be practiced without these specific details. While certain components are shown in block diagram form to describe one or more aspects, it is to be understood that functionality performed by a single component may be performed by multiple components. Similarly, a single component may be configured to perform functionality described as being performed by multiple components.

Various aspects of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the scope of the claimed subject matter.

Figure 1A:
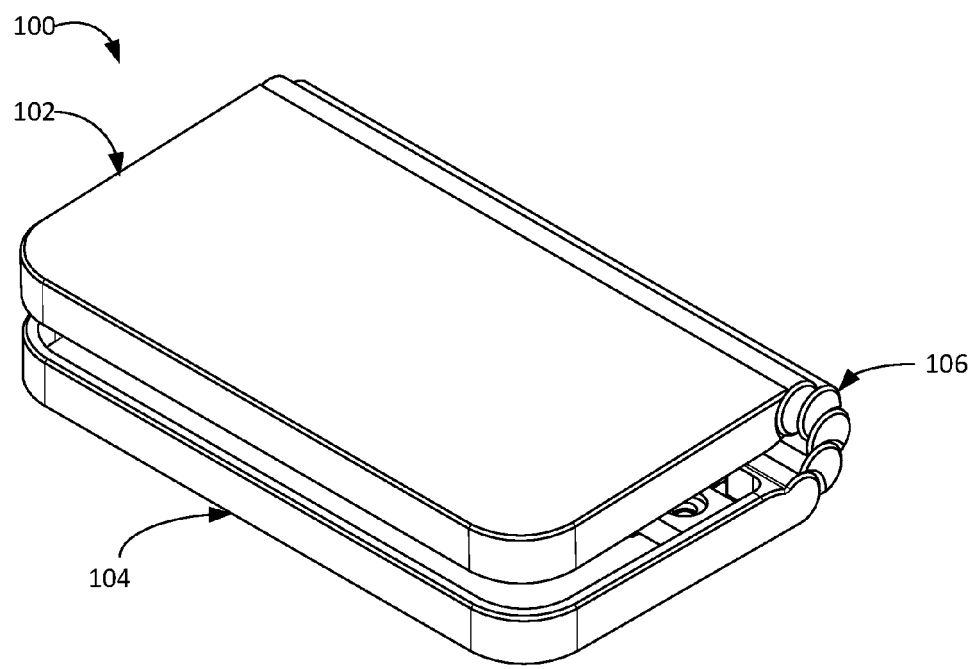
FIGS. 1A-1C illustrate perspective views of an example device that includes a sequential multi-pivot hinge assembly.
Figure 1B:
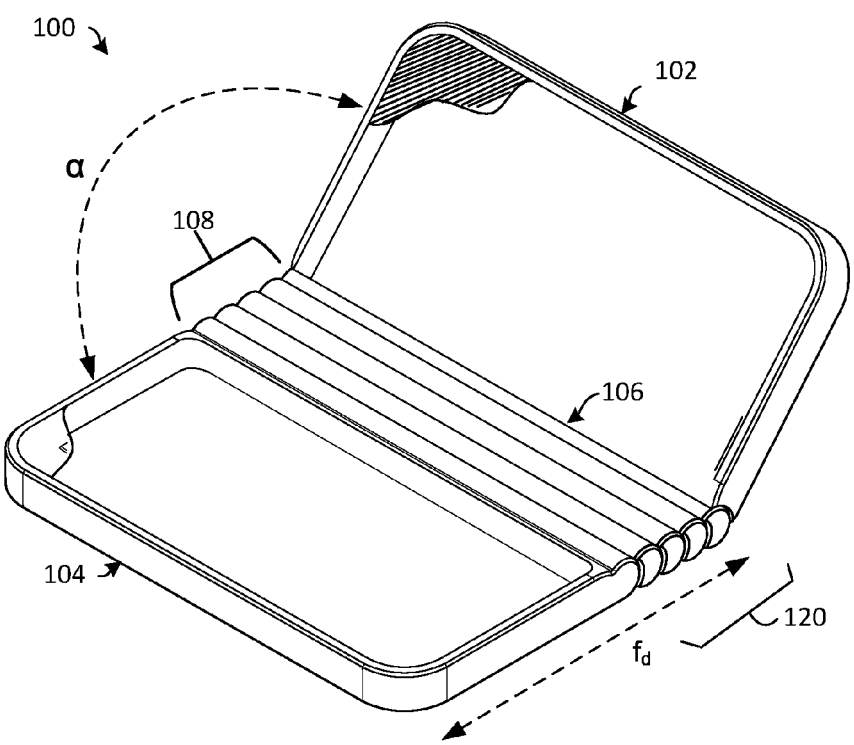
Figure 1C:
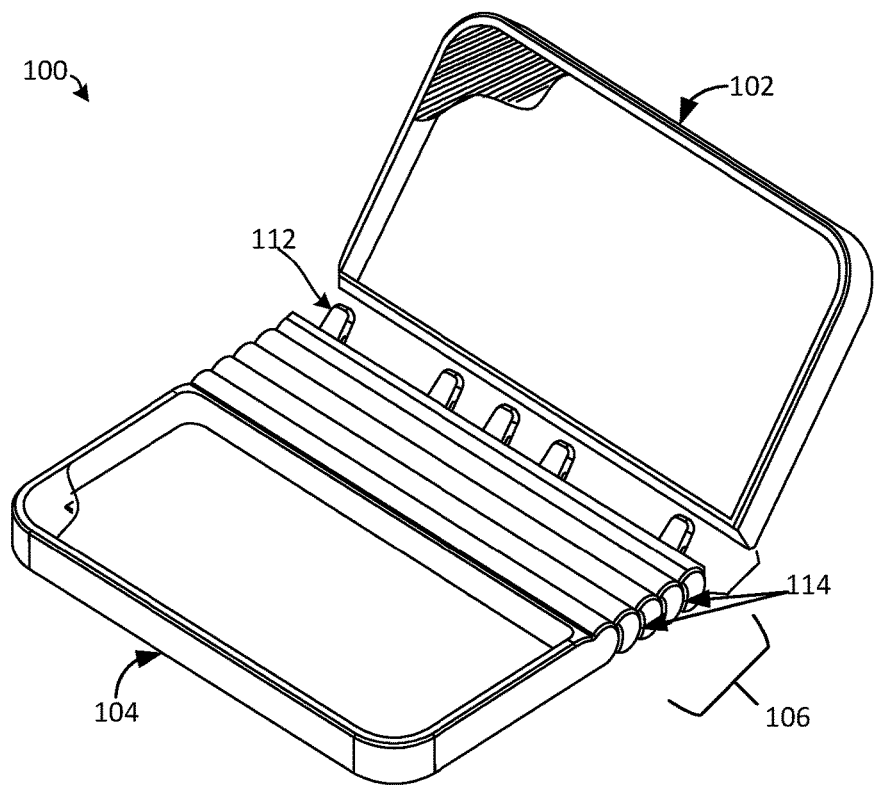

FIGS. 1A-1C collectively illustrate perspective views of an example device that includes a sequential multi-pivot hinge assembly, according to some examples.

In an example, illustrated by FIGS. 1A-1C, computing device 100 may be a computing device having a first portion 102 and a second portion 104 rotatably secured together by a multi-pivot hinge assembly 106. The multi-pivot hinge assembly 106 may also be called a sequential multi-pivot hinge assembly. In some examples, the first portion 102 may be a tablet device having a touch screen and the second portion 104 may be an input device.

In an example, the second portion 104 may be a keyboard. Other implementations can employ other input devices. Further, the first portion 102 may include a display screen, such as a touch sensitive display screen. The computing device 100 can also include computing elements such as a processor, memory/storage, a battery, and/or a video or graphics processor, among other components/elements. These elements may be positioned in the first portion 102 and/or second portion 104.

FIG. 1A shows the computing device 100 in a closed position from a "front" view of the computing device 100. In the closed position, each hinge of the multi-pivot hinge assembly 106 is rotated to its individual fully closed position to position the first portion 102 over the second portion 104. In an example shown in FIG. 1A, in the closed position, the second portion 104 can be configured to be positioned on a generally horizontal surface such as a table top, and the first and second portions 102 and 104 may be generally parallel to one another and the horizontal surface (e.g., the first portion 102 is juxtaposed over the second portion 104).

In the closed position, the first portion 102 and the second portion 104 may be at a rotational angle of approximately zero degrees relative to each other; however, this closed angle may be more or less depending on the particular hinge assembly implementation. For example, a device may have a closed angle of around negative two to negative five degrees.

FIG. 1B shows the computing device 100 in an open or deployed position. In the open position the first portion 102 and the second portion 104 may be at an obtuse angle relative to each other to enable interaction with the first portion 102. The opening angle 108 (shown as α) may be predefined by the design of the multi-pivot hinge and customized depending on the type of device or preference of a user or manufacturer. In some examples, the deployed position may be somewhere in the range of 90 degrees to 180 degrees, depending on a viewer's comfortable viewing angle.

In an example, the opening angle 108 may be around 125-135 degrees. As will be described in further detail, each hinge of the multi-pivot hinge assembly 106 may have maximum allowable degree of rotation, which may be predetermined based on the opening angle 108 desired and defined by the device. That is, the total opening angle 108 divided by the number of hinges of the multi-pivot hinge assembly 106 may determine the allowed degree of rotation of each hinge. The calculated degree of rotation of each hinge of the multi-pivot hinge assembly 106 may also be adjusted to allow for tolerances and to customize the rotation angle of the multi-pivot hinge assembly 106.

In another example, in the open position, the multi-pivot hinge assembly 106 may provide a foot 120, or an extended footprint of the computing device 100, that may increase the stability of the computing device 100 and reduce the likelihood of the computing device 100 tipping over backward in the deployed position from the weight of the computing device 100. That is, the sequential nature of the multi-pivot hinge assembly 106 may create the foot 120 in the deployed position that can help stabilize the computing device 100 and decrease tipping (e.g., maintain the center of mass over the footprint).

FIG. 1C shows the computing device 100 in a detached position. In some examples, the multi-pivot hinge assembly 106 can be secured to the first portion 102 and the second portion 104 in a relatively permanent manner via a fastening component (e.g., in a manner that is not intended to be readily separable by an end user). Alternatively, the multi-pivot hinge assembly 106 can be secured to the first portion 102 and the second portion 104 in an attachable/detachable manner as shown in FIG. 1C.

In an example, the multi-pivot hinge assembly 106 may include one or more protrusions 112, or fangs, configured to engage with one or more receptacles of the first portion 102 to attach the multi-pivot hinge assembly 106 to the first portion 102. The protrusions 112 may be configured to engage with receptacles (not shown) of the first portion 102 via a latch mechanism or via a magnetic mechanism enabling a quick and easy attach/detach mechanism for an end user. Other attach/detach assemblies may also be contemplated. Similarly, the multi-pivot hinge assembly 106 may attach to the second portion 104 by similar permanent or detachable means as described above.

Alternatively, or additionally to the mechanical coupling described above, the quick attach/detach assembly can enable electronic components of the first portion 102 and the second portion 104 to attach and detach in order to electrically couple processor, storage/memory, and/or battery from the first portion 102 to the graphics processor and/or keyboard in the second portion 104, for example.

Thus, the quick attach/detach assembly can allow the user to be able to detach the first portion 102 or the second portion 104 to use either portion independent of the other. For example, the first portion 102 may be operated as a stand-alone tablet device, and then may be attached to second portion 104, via multi-pivot hinge assembly 106, allowing the computing device 100 to function similar to a laptop device. Additionally, a user may also be able to exchange the first portion 102 or the second portion 104 for application-specific devices. For example, an individual second portion 104 may include a keyboard and/or a touchscreen. In certain scenarios, the user may attach a first touchscreen as the first portion 102 and a second touchscreen as the second portion 104, and utilize the computing device 100 like a book. In other scenarios, the user may attach a touchscreen as the first portion 102 and an input device, manifest as a keyboard and trackpad, as the second portion 104, and utilize the computing device 100 like a laptop. Other configurations and implementations may be contemplated.

As also illustrated in FIGS. 1A-1C, the multi-pivot hinge assembly 106 includes articulating hinge covers (e.g., hinge covers 114) that can obscure and/or protect the underlying elements, including the individual frames or hinges of the multi-pivot hinge assembly 106. Each frame or hinge of the multi-pivot hinge assembly 106 may include an individual hinge cover, and each individual hinge cover may overlap with an adjacent hinge cover to visually hide and protect the components of the multi-pivot hinge assembly 106.

FIGS. 2-4 collectively illustrate more details about the example multi-pivot hinge assembly 200 including the individual hinge frames introduced above. Note that due to space constraints on the drawing pages, not all elements are labeled in each figure, and not every instance of every element is labeled, rather representative elements are labeled.

Figure 2A:
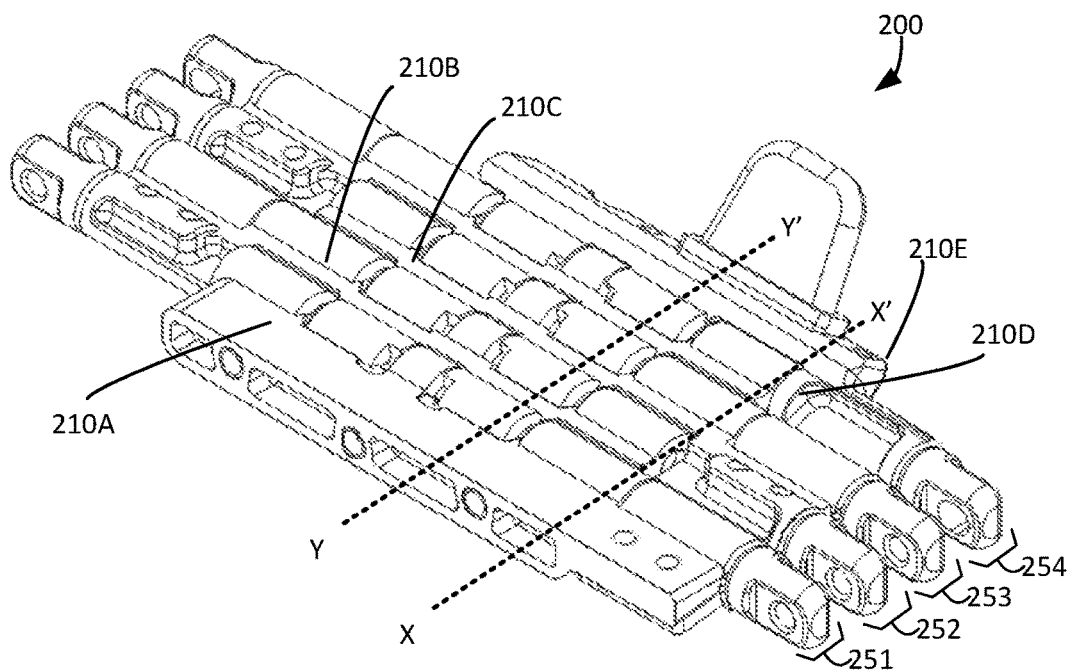
FIGS. 2A-2B illustrate assembled and exploded views of an example multi-pivot hinge assembly.
Figure 2B:
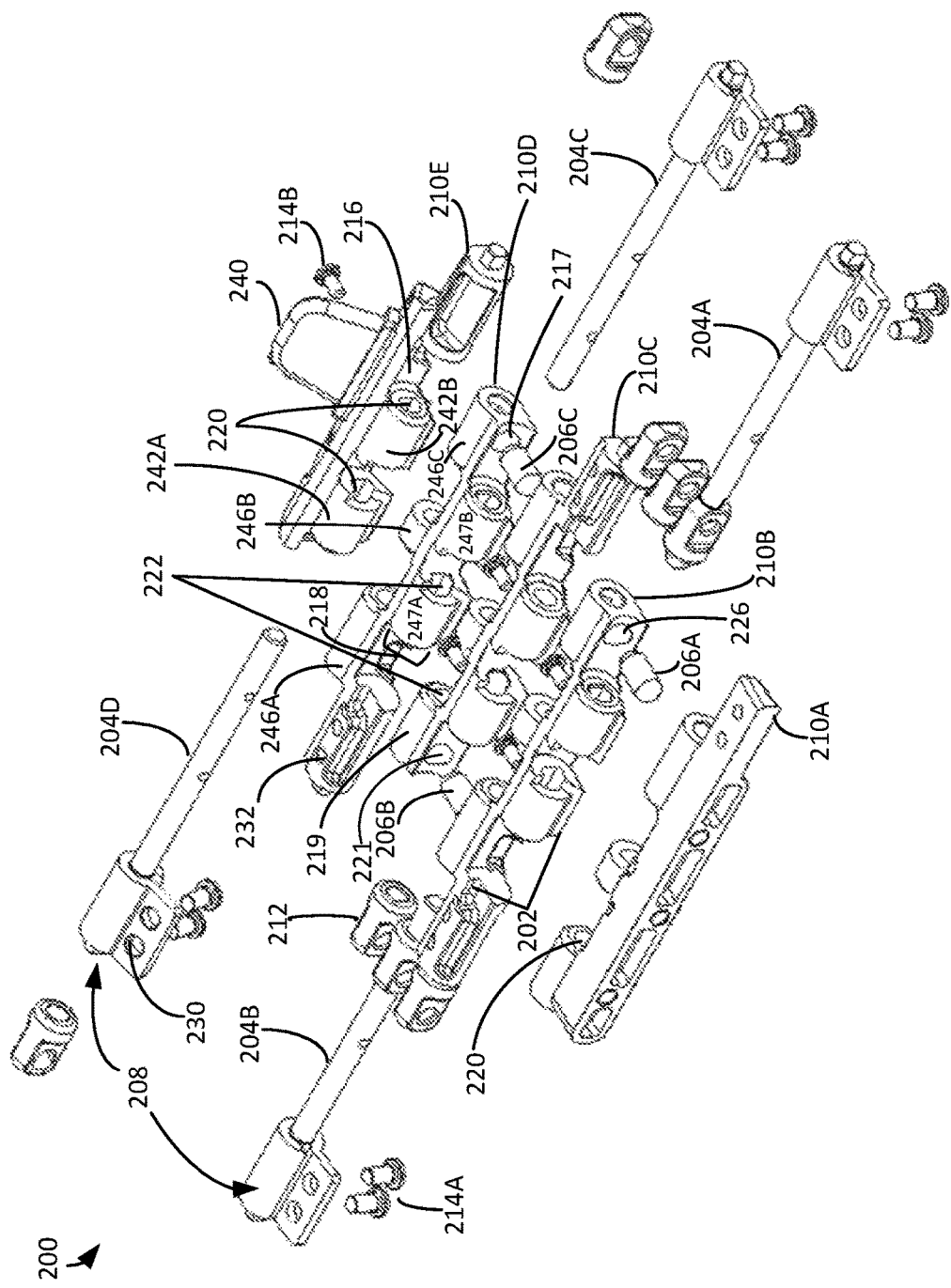

FIGS. 2A and 2B illustrate assembled and exploded views of an example multi-pivot hinge assembly. FIG. 2A illustrates a perspective assembled view of the fully integrated multi-pivot hinge assembly 200 which includes friction, timing and kinematic components to control the order of rotation, degree of rotation and increasing stability of the module. Also shown in FIG. 2A are reference lines X-X' and Y-Y' for the cross-section regions illustrated in FIGS. 3A and 3B and 4A-4R. Reference line X-X' is drawn through a portion of the of the frames having offset regions with a circular inner profile corresponding to FIGS. 4A-4R, and reference line Y-Y' is drawn through a portion of the frames having offset regions with a uniquely shaped inner profile corresponding to FIGS. 3A-3B as will be described in further detail below.

As shown in FIG. 2A, the multi-pivot hinge assembly 200 may include a set of frames (e.g., frames 210A, 210B, 210C, 210D, 210E) which function together to create sequential hinges. The multi-pivot hinge assembly 200 may have at least three frames: two outer frames and at least one inner frame. The outer frames have shaft enclosures that, in combination with shaft enclosures from an adjacent inner frame can rotate about a shaft. For example, adjacent frames 210A and 210B create a first hinge 251, adjacent frames 210B and 210C create a second hinge 252, adjacent frames 210C and 210D create a third hinge 253, and adjacent frames 210D and 210E create a fourth hinge 254. Each of the hinges may be covered by a hinge cover (see dotted lines in FIG. 2C).

"Fully integrated" as used herein, indicates that each component is a permanent part of the assembly and is manufactured in place, such that the assembly is a fully assembled single unit. In some examples, two or more fully integrated multi-pivot hinge assembly units may be used together to form a fully functioning hinge assembly. For example, a first multi-pivot hinge assembly may be on a first end and a second multi-pivot hinge assembly may be on a second end, where each hinge of the multi-pivot hinge assemblies is joined by a set of overlapping hinge covers.

FIG. 2B illustrates an exploded view of the multi-pivot hinge assembly 200. As shown in FIG. 2B, components may include individual frames (e.g., frames 210A, 210B, 210C, 210D, 210E), which include rotational limiting surfaces 202, two or more sequencing pins 206, two or more shafts 204, friction bands 208, removable couplers 212, and fasteners 214. Each individual hinge frame (e.g., frames 210A, 210B, 210C, 210D, 210E) may also include a plurality of cam surfaces 216 for engaging the sequencing pins 206 and controlling sequential rotation of each hinge frame 210. The sequencing pins 206 may be thought of as locking cam members that slide laterally within a slot 217 near an end of a frame (e.g., slot 217 shown near frame 210D) and engage and disengage with opposing cam surfaces 216 of the frames (e.g., frames 210A, 210B, 210C, 210D, 210E). One or more additional slots may be formed between adjacent frames to accommodate the one or more other sequencing pins 206 of the multi-pivot hinge module. In a system according to certain examples, one or more of the components of the multi-pivot hinge assembly 200 may be composed from steel.

In a system according to certain implementations, the multi-pivot hinge assembly 200 may include five radially arranged frames (e.g., frames 210A, 210B, 210C, 210D, 210E); however more or less frames may be used in other implementations. The frames (e.g., frames 210A, 210B, 210C, 210D, 210E) may include a base frame 210A which may be configured to attach to a second portion or input device of a computing device, and a receiving frame 210E which may be configured to attach to a first portion, such as a tablet or display screen of a computing device via a fang protrusion 240. The multi-pivot hinge assembly 200 may also include three middle frames, 210B, 210C, and 210D. Each of the individual frames may be configured to couple together via offset portions (e.g., offset portion 218) that correspond with opposing offset portions (e.g., offset portion 219) of adjacent frames.

In an example, the offset portions include openings, which when aligned with each other form passageways (e.g., passageway 220). When adjacent frames are coupled together, the openings of each offset portion may align to form passageways to enable insertion of a shaft 204. For example, when frame 210C is coupled with adjacent frame 210D, the openings of each frame's offset region (for example offset portion 218 and offset portion 219) may align to form passageway 222. Likewise, when frame 210D is coupled with adjacent frame 210E, the openings of each frame's offset regions may align to form another passageway 220. Each offset portion can form the passageways (e.g. passageway 220) by being in the form of shaft enclosures. In the illustrated example, the base frame 210A has three shaft enclosures; receiving frame 210E has two shaft enclosures; and each of the inner frames (middle frames 210B, 210C, and 210D) include five shaft enclosures, with three shaft enclosures configured to engage with two shaft enclosures from one adjacent frame and two shaft enclosures to engage with three shaft enclosures from another adjacent frame. For example, shaft enclosures 242A and 242B of receiving frame 210E are configured to combine with shaft enclosures 246A, 246B, and 246C of adjacent middle frame 210D to provide a hinge that rotates about a shaft. Shaft enclosure 246A of middle frame 210D is configured to fit between shaft enclosures 242A and 242B of receiving frame 210E. As also shown in FIG. 2B, and described further below, the shaft 204 may have a unique profile to prevent rotation when the shaft is in position within the shaft enclosures. For example, the shaft 204 may have a profile that approximates a capital "D." At least a portion of the shaft enclosures of coupled adjacent frames may also be keyed in a similar profile to prevent rotation of the shaft 204 within the shaft enclosure, while the remaining shaft enclosures have a round profile to enable rotation of the adjacent frames. As shown in FIG. 2B, for example, the inner frames (i.e. middle frames 210B, 210C, and 210D) include five shaft enclosures, with three rounded or circular profile shaft enclosures on one side of the frame configured to engage with two keyed shaft enclosures from an adjacent frame and two keyed shaft enclosures on the other side of the frame to engage with three circular shaft enclosures from another adjacent frame. For example, inner frame 210D is configured to couple with frame 210E on one side and 210C on the other side. When frame 210D couples with frame 210E, shaft enclosures 246A, 246B, and 246C of frame 210D having circular inner profiles couple with shaft enclosures 242A and 242B having keyed inner profiles of frame 210E to form passageway 220. Likewise, frame 210D includes two shaft enclosures 247A and 247B on the opposite side of the frame which have keyed inner profiles and are configured to engage with three shaft enclosures having circular inner profiles of adjacent frame 210C to form passageway 222.

A shaft (e.g., shaft 204) may be inserted in the passageway formed between coupled adjacent frames to rotatably secure the adjacent frames together. Each shaft 204 defines the axis of rotation that each of the frames may rotate (or pivot) around shown as individual axes 290A, 290B, 290C, and 290D in FIG. 2C.

Referring to FIG. 2B, receiving frame 210E may be rotatably secured to frame 210D by shaft 204D, frame 210D may be rotatably secured to frame 210C by shaft 204C, frame 210C may be rotatably secured to frame 210B by shaft 204B, and frame 210B may be rotatably secured to frame to base frame 210A by shaft 204A. Each shaft may define the axis of rotation of a sequential hinge formed by adjacent frames, such that there are four axes of rotation associated with a five-frame multi-pivot hinge. These axes of rotation may be "hinges" of the multi-pivot hinge assembly 200.

In an implementation, the shafts 204 may not have a circular profile when viewed transverse their long axis but may be keyed in a unique shape. For example, the shafts 204 may have a profile that approximates a capital "D". As previously described a passageway for the shaft may be formed by coupled shaft enclosures of adjacent frames. At least two a portion of the shaft enclosures may have a similar profile so that the shaft is keyed or locked and prevented from rotating within the passageway. It is contemplated that other keyed shaft profiles can be utilized that cause the shaft to be non-rotatable.

In an additional implementation, each shaft 204 may include a friction band 208 on at least one end of the shaft 204 that may act as a friction interface between the frames (e.g., frames 210A, 210B, 210C, 210D, 210E) to provide an arresting force for the attached device. The friction bands 208 may control friction via interference. That is, the friction bands 208 may be undersized relative to a shaft diameter, and the shaft 204 may cause the friction band 208 to expand when the friction band 208 is inserted over the shaft 204. An amount of friction may be adjusted by factors such as a thickness and length of the friction band 208, the diameter of the shaft 204, a type of grease used, and other known friction technologies. Various types of friction bands 208 may be contemplated.

In one example, the friction bands 208 may be sheet metal bands that are wrapped around the shaft 204 and secured to one of the frames (e.g., frame 210A, 210B, 210C, 210D, 210E) via a plurality of fasteners 214A. The fasteners 214A may secure the friction bands 208 to corresponding frames via a plurality of holes 230 formed in the friction band 208 that may overlap with a plurality of holes 232 formed in a corresponding frame. The plurality of holes 232 formed in the corresponding frame may be threaded to engage the fasteners. In another example, the friction band 208 may be a metal injection molded band (MIM) made out of a separate metal injection molded part and engaged with an end of the shaft 204. In another example, a MIM band can be integrated with or manufactured attached to the frame assembly, and in yet another example, the friction band 208 may include axial thrust using washers that are axially spring loaded and move relative to each other to control the friction.

Additionally, after insertion of the shafts 204 through the passageways to couple adjacent frames (e.g., frames 210A, 210B, 210C, 210D, 210E), the shafts 204 may be secured to the frames (e.g., frames 210A, 210B, 210C, 210D, 210E) via a plurality of fasteners 214B, which may be configured to bias the shafts 204 against a frame to eliminate free play or "floating" between the shafts 204 and the frame passageway (e.g., passageways 220 and 222). Furthermore, a set of removable couplers 212 may be inserted over a distal end of each shaft 204. The removable couplers 212 may include a plurality of holes for attachment of hinge covers to each of the frames (e.g., frames 210A, 210B, 210C, 210D, 210E) via another set of fasteners (shown in FIG. 3).

In an implementation, each of the offset portions (e.g., offset portions 218 and 219) of the frames (e.g., frames 210A, 210B, 210C, 210D, 210E) may include rotational limiting surfaces 202. The rotational limiting surfaces 202 may define the degrees of rotation of each frame (e.g., frame 210A, 210B, 210C, 210D, 210E) around an individual axis of rotation defined by the shaft 204. The rotational limiting surfaces 202 are shown in FIG. 2B as notches and grooves that engage with each other during rotation and prevent rotation beyond a defined number of degrees.

In a further implementation, a set of sequencing pins 206 may interact with opposing cam surfaces 216 of adjacent frames (e.g., frames 210A, 210B, 210C, 210D, 210E) to control a timing and order of rotation about the individual axes of rotation associated with each frame hinge (e.g., hinges 251-254 shown in FIG. 2A). The opposing cam surfaces 216 may be coordinating concave and convex surfaces that enable the frames (e.g., frames 210A, 210B, 210C, 210D, 210E) to rotate smoothly as a hinge. As will be discussed in more detail below in association with FIG. 4, the sequencing pins 206 may be sliding elements that cam off opposing frame cam surfaces (e.g., cam surfaces 216) to lock and unlock individual sequencing pins 206. The sequencing pins (e.g., sequencing pins 206A, 206B, 206C may slide in a channel or a slot formed by a recessed portion on an end of each frame between two frames having opposing cam surfaces 216. The slots are shown in FIG. 2 as slot 226, slot 217 and slot 221. As shown in FIG. 2, sequencing pin 206A may slide through slot 226, sequencing pin 206B may slide through slot 221, and sequencing pin 206C may slide through slot 217. The slots (e.g., slots 226, 217 and 221) may be thought of as a hole or a channel that is formed within each frame and enable the sequencing pins 206 to slide between frames in a direction perpendicular to the frames. The cam surfaces 216 may be embedded into each of the frames (e.g., frames 210A, 210B, 210C, 210D, 210E) to enable the sequencing pins 206 to slide between the frames (e.g., frames 210A, 210B, 210C, 210D, 210E) to enable the hinges to lock and unlock to rotate. Such a configuration can allow the multi-pivot hinge assembly 200 to roll and unroll in a controlled sequential manner by causing only one hinge to rotate at a time.

In some examples, two of the sequencing pins (e.g., pins 206A and 206C) may be located near a front side of the multi-pivot hinge assembly 200 and an additional pin (e.g., pin 206B) may be located near a back side of the multi-pivot hinge assembly 200. Front and back sides are used for purposes of this view displayed in FIG. 2A. The sequencing pins 206 together with the rotational limiting surfaces 202 of each frame (e.g., frames 210A, 210B, 210C, 210D, 210E) may control the timing, order, and a degree of rotation of each hinge of the multi-pivot hinge assembly 200.

Figure 2C:
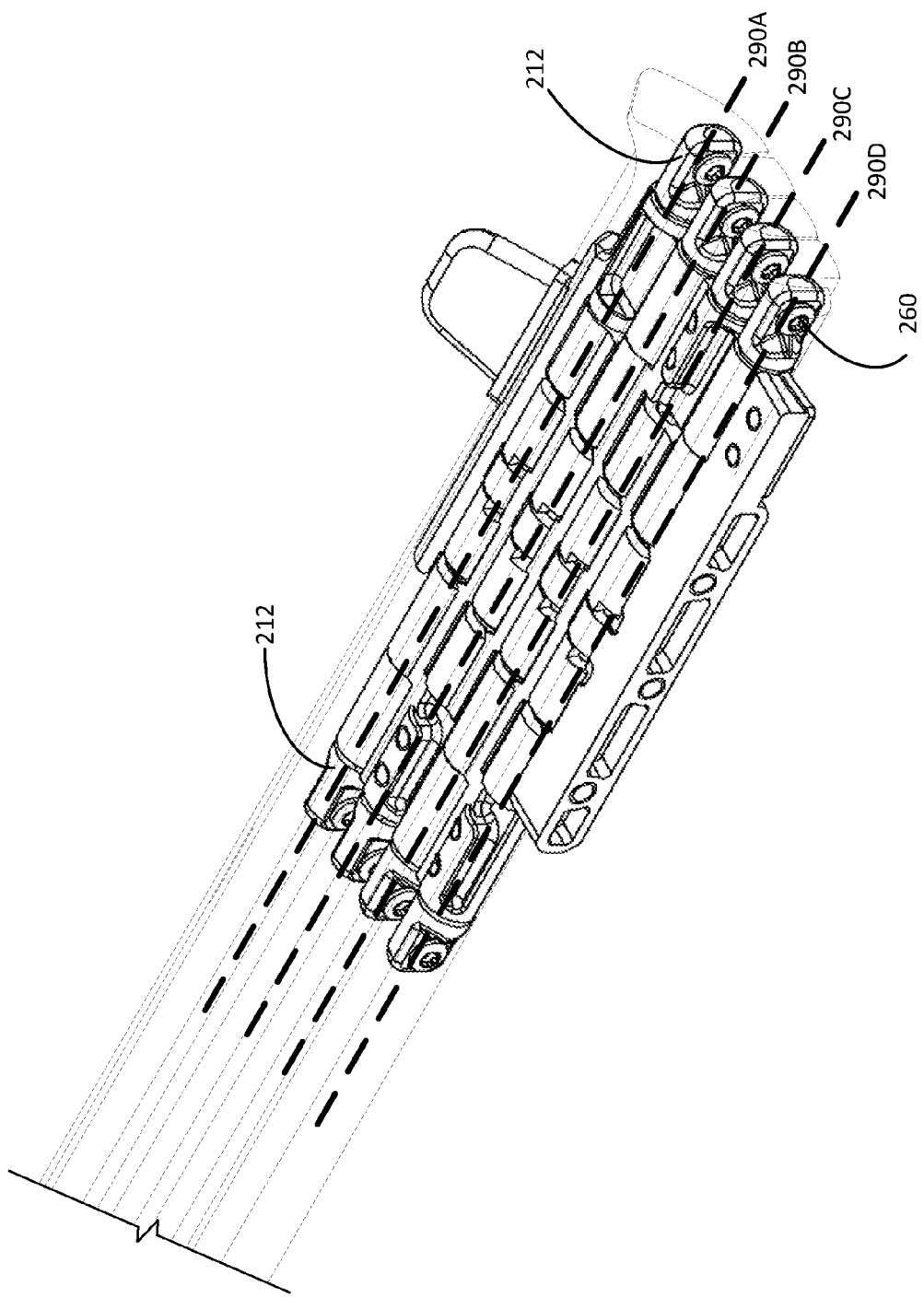
FIG. 2C illustrates an assembled hinge including hinge covers.

FIG. 2C illustrates assembled components of the multi-pivot hinge assembly, including a plurality of hinge covers (shown dotted) in place over the multiple hinges. Each hinge corresponds to individual axes created by adjacent frames pivotally connected by a shaft, e.g. axes 290A-290D.

In an example, each individual hinge cover may overlap with an adjacent hinge cover to visually hide and protect the components of the multi-pivot hinge assembly. Thus the sequential hinge covers can function to both protect the hinge from the user and the user from the hinge. The hinge covers can also contribute structurally to the hinge functionality, and thus the hinge covers can be thought of as integrated with the multi-pivot hinge assembly in that they (e.g., the hinge covers) can be dual function elements that contribute to both the hinge functionality and the hinge cover functionality. The hinge covers may also function as a foot, or a stand, for the device when in a fully open position, and extend a footprint of the device when the device is deployed in an open position.

Figure 3A:
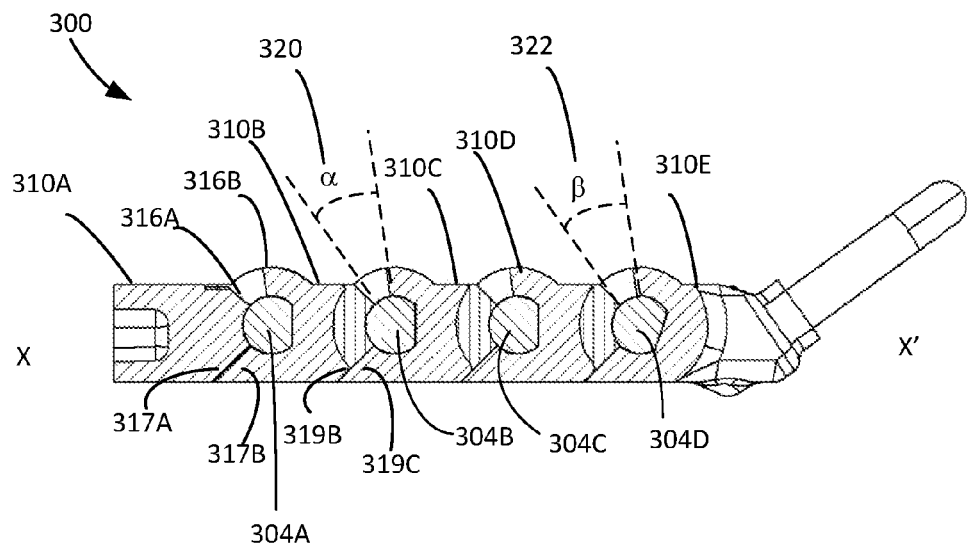
FIGS. 3A-3B illustrate a cross sectional view of rotational limiting surfaces of sequential frames of a multi-pivot hinge assembly.
Figure 3B:
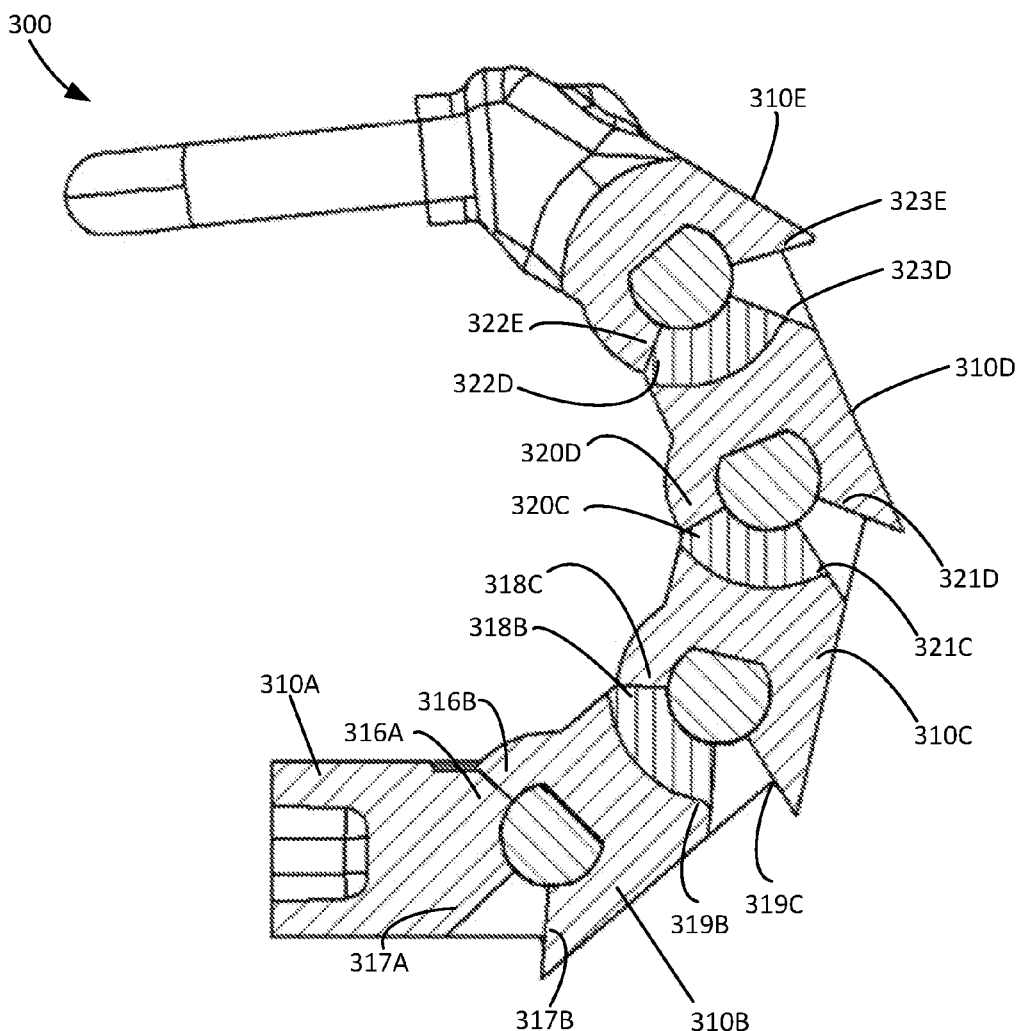

FIGS. 3A and 3B illustrate a cross sectional view of rotational limiting surfaces of sequential frames of a multi-pivot hinge assembly, according to some examples.

FIG. 3A shows a cross sectional view of a multi-pivot hinge assembly 300 in a fully open configuration featuring five sequential frames (310A-310E) rotatably coupled together by shafts (304A-304D). As described previously, the rotational limiting surfaces may be notches on opposing offset portions of adjacent frames that are configured to engage in order to limit a degree of rotation about each individual frame axis to a predefined number of degrees. In reference to frame 310A coupled with frame 310B, frame 310A includes a top limiting surface 316A configured to engage with a top limiting surface 316B of frame 310B, and a bottom limiting surface 317A configured to engage with a bottom limiting surface 317B of frame 310B. Similarly, bottom limiting surface 319B of frame 310B is configured to engage with a bottom limiting surface 319C of frame 310C. Thus, the bottom limiting surfaces limit rotation in an opening direction, and the top limiting surfaces limit rotation in a closing direction.

In a fully open configuration shown in FIG. 3A, the bottom limiting surfaces of adjacent frames (e.g., frames 310A-310E) are engaged, preventing further opening or unrolling of each hinge. For example, bottom limiting surface 319B is in contact with bottom limiting surface 319C, and bottom limiting surface 317A is in contact with bottom limiting surface 317B. While the bottom limiting surfaces (e.g., 317A with 317B and 319B with 319C) are in contact, the top limiting surfaces (e.g., 316A and 316B) are not in contact. When not in contact, there is a gap between the top limiting surfaces of each frame, where the angle of the gap α 320 may define the degree of rotation for each axis of rotation associated with adjacent frames.

In a fully closed configuration of a multi-pivot hinge assembly 300 shown in FIG. 3B, the top limiting surfaces (e.g., top limiting surfaces 316A, 316B, 318B and 318C) of adjacent frames are in contact, preventing further closing or rolling of each hinge. For example, as shown, top limiting surface 316A of frame 310A is in contact with top limiting surface 316B of frame 310B, and top limiting surface 318B of frame 310B is in contact with top limiting surface 318C of frame 318C. Similarly, top limiting surface 320C of frame 310C is in contact with top limiting surface 320D of frame 310D, and top limiting surface 322D of frame 310D is in contact with top limiting surface 322E of frame 310E. While the top limiting surfaces are in contact, there is a gap between bottom limiting surfaces (e.g., 317A with 317B, 319B with 319C, 321C with 321D, and 323D with 323E).

In an implementation, the angles of rotation of each axis of rotation can be predefined based on predetermined fully open and fully closed angles, and additional tolerances may also be built in to allow for variances. For example, in one example scenario, a fully open multi-pivot hinge assembly may have an angle of around 125 to 135 degrees, and may have a fully closed angle of around negative 2 degrees. Based on these angles all four hinges may have an equal degree of rotation of around 135 degrees divided by 4, or 33.75 degrees.

In another example, the first three hinges may have an equal degree of rotation (e.g., angle α 320 in FIG. 3A) and the fourth hinge, angle β 322 in FIG. 3A, may have a lesser degree of rotation in order to limit rotation of the final frame hinge to limit the display angle. For example, in the multi-pivot hinge assembly shown in FIGS. 3A and 3B, the angle α 320 may be around 36.5 degrees and the angle β 322 of the fourth frame hinge may be restricted to 19 degrees. This final angle β 322 can be adjusted to allow for larger opening angle. Additionally, the angle of rotation may be determined based on cosmetic purposes, and thus restricted to prevent visual access to interior components of the hinge.

In a further implementation, nominal gaps may be built into the rotational limiting surfaces of the base frame 310A and the receiving frame 310E to allow for tolerances.

In another example described in more detail below, a set of sequencing pins may also be integrated with the rotational limiting surfaces of the frames to control an order, timing, and a degree of rotation of the frames. The sequencing pins may be coincident angularly with the rotational limiting surfaces.

Figure 4A:
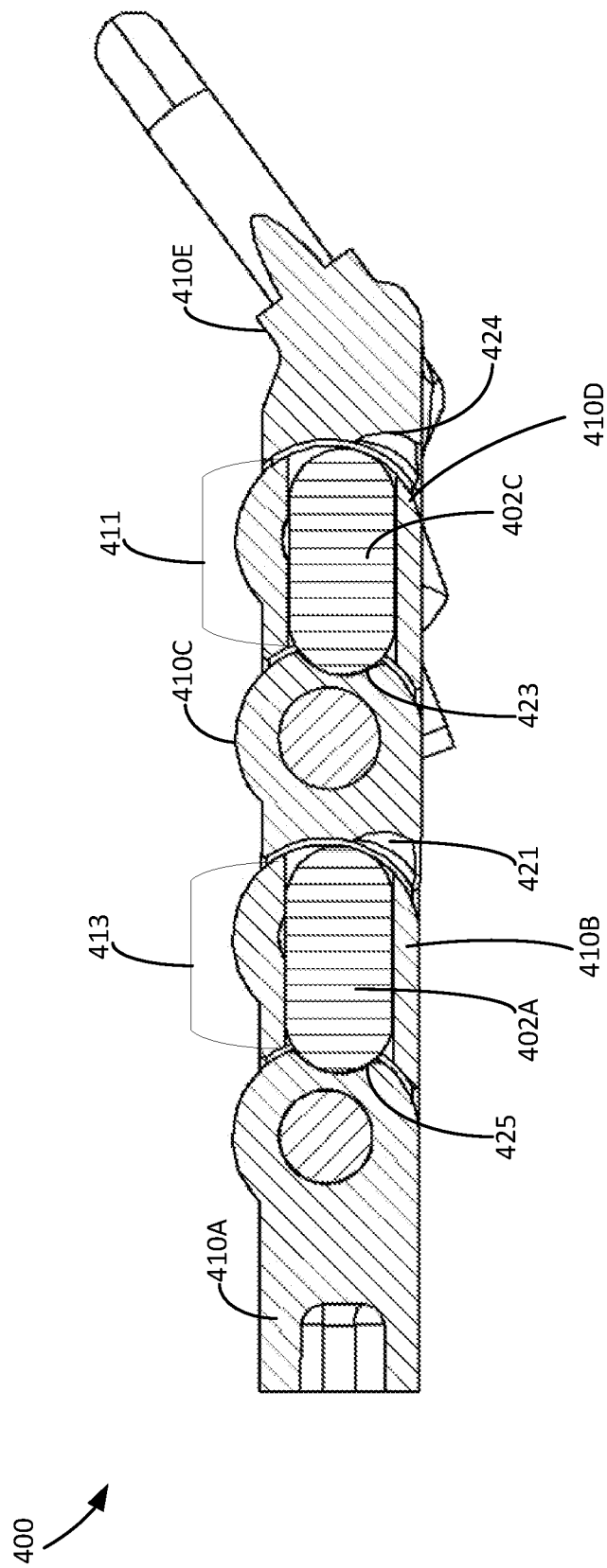
FIGS. 4A-4R illustrate sequencing pin position of a multi-pivot hinge assembly from open to closed position and again from closed to back open position.
Figure 4B:
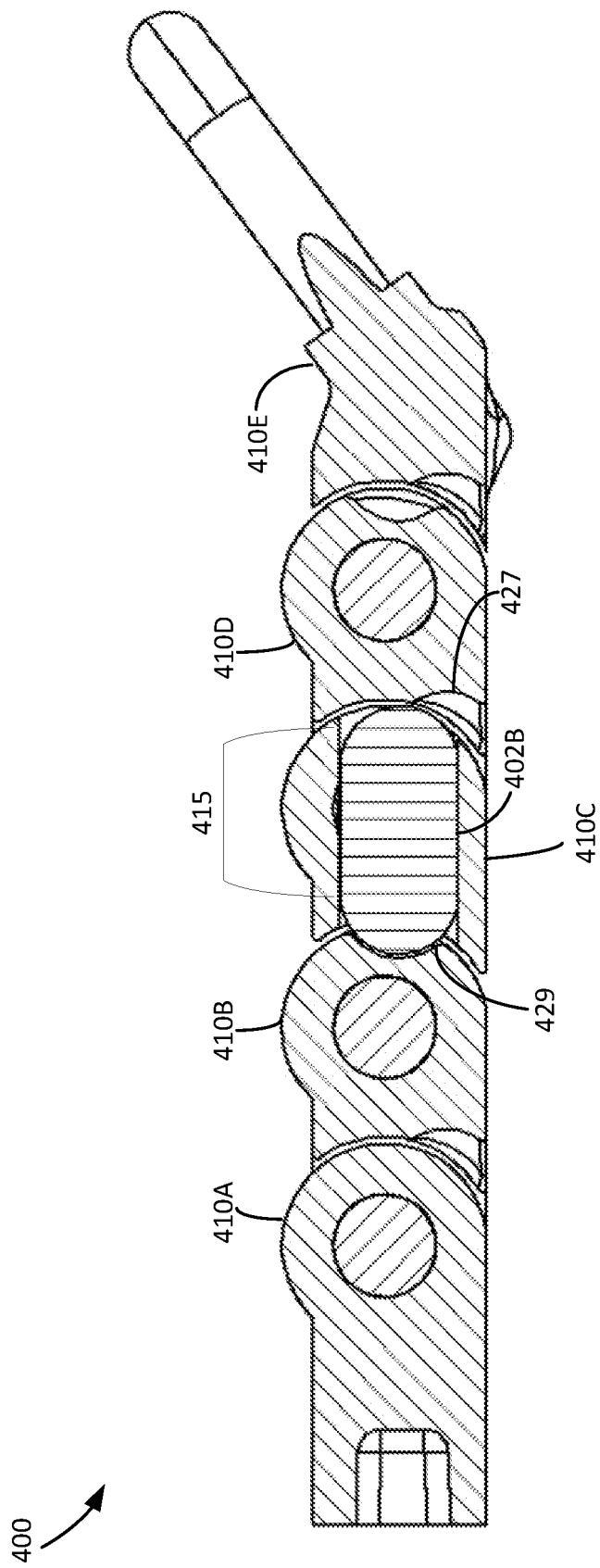
Figure 4C:
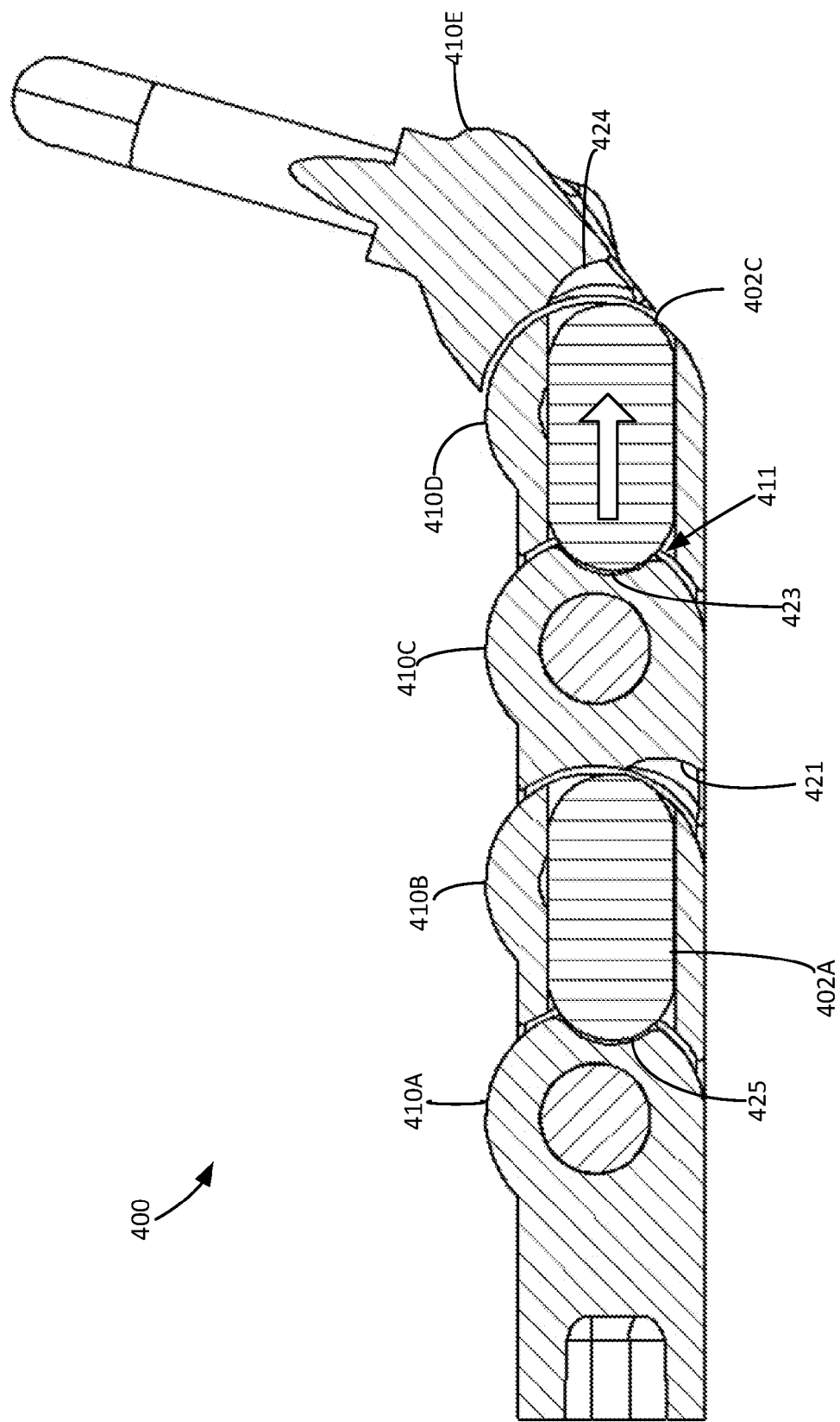
Figure 4D:
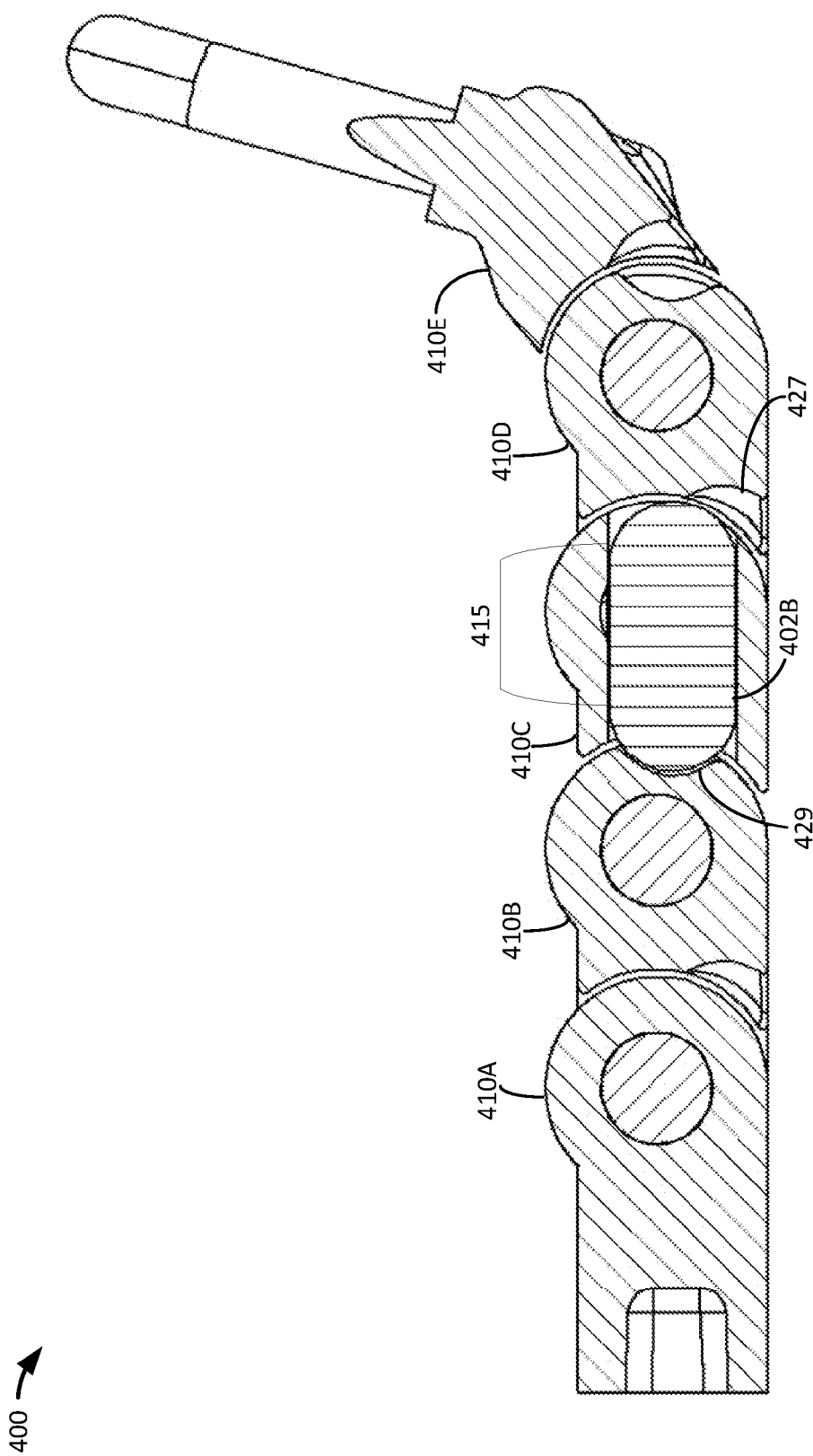
Figure 4G:
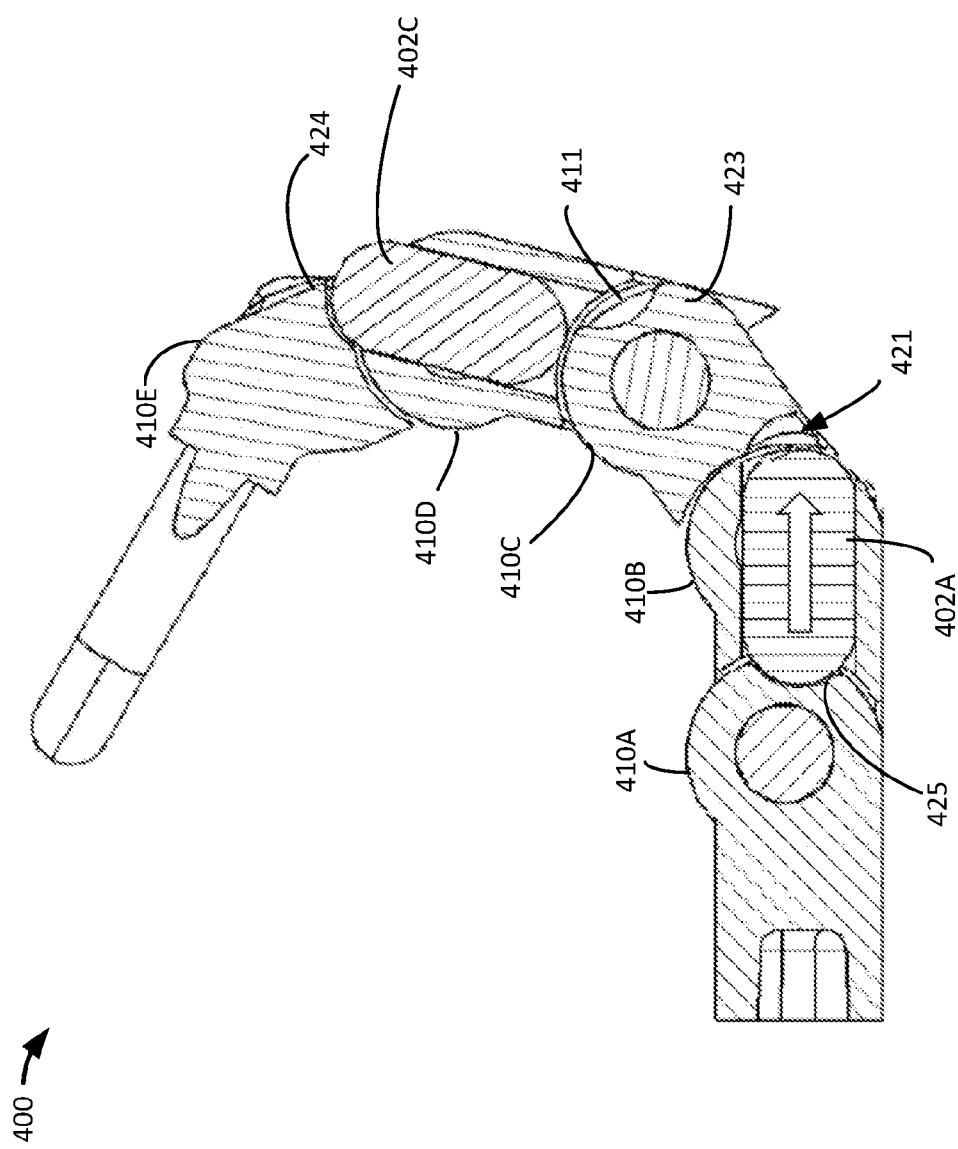
Figure 4H:
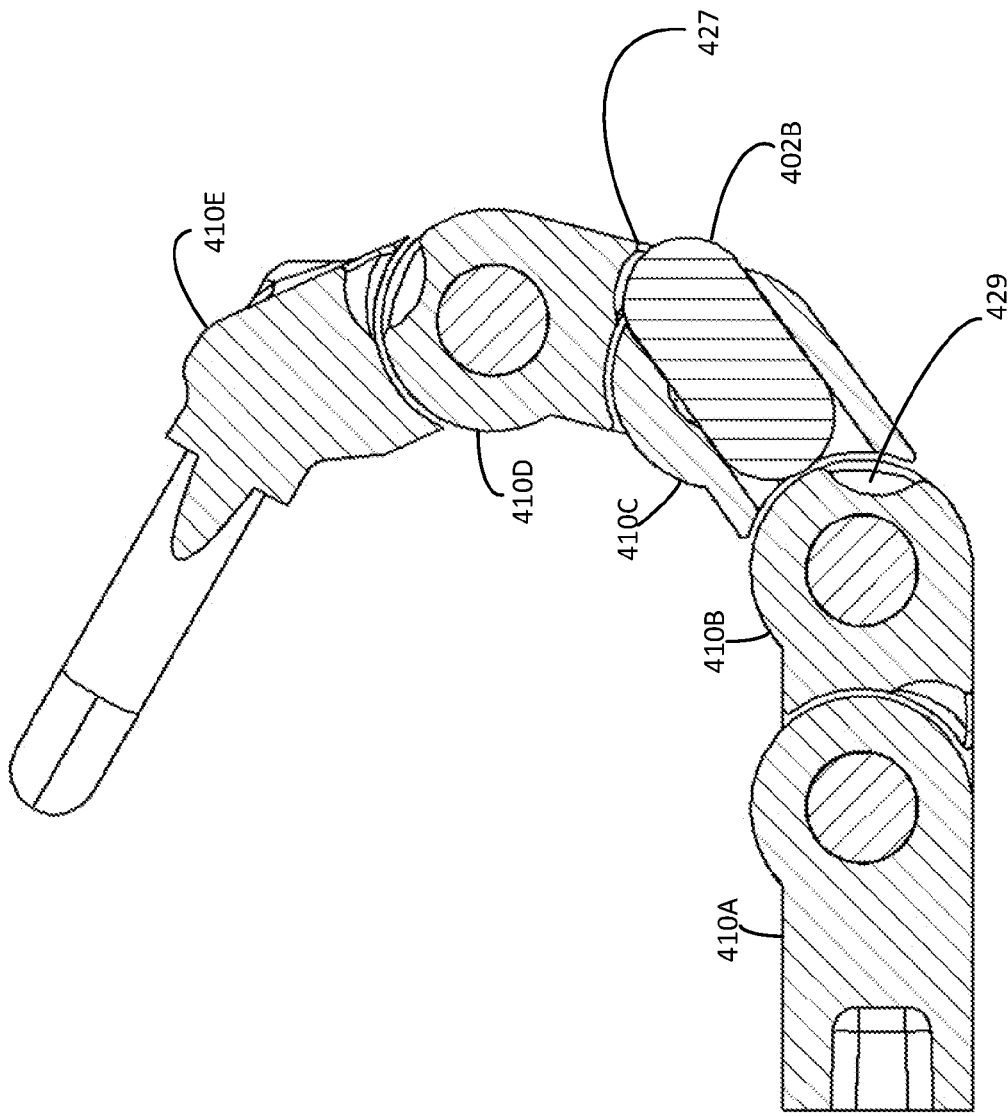
Figure 4I:
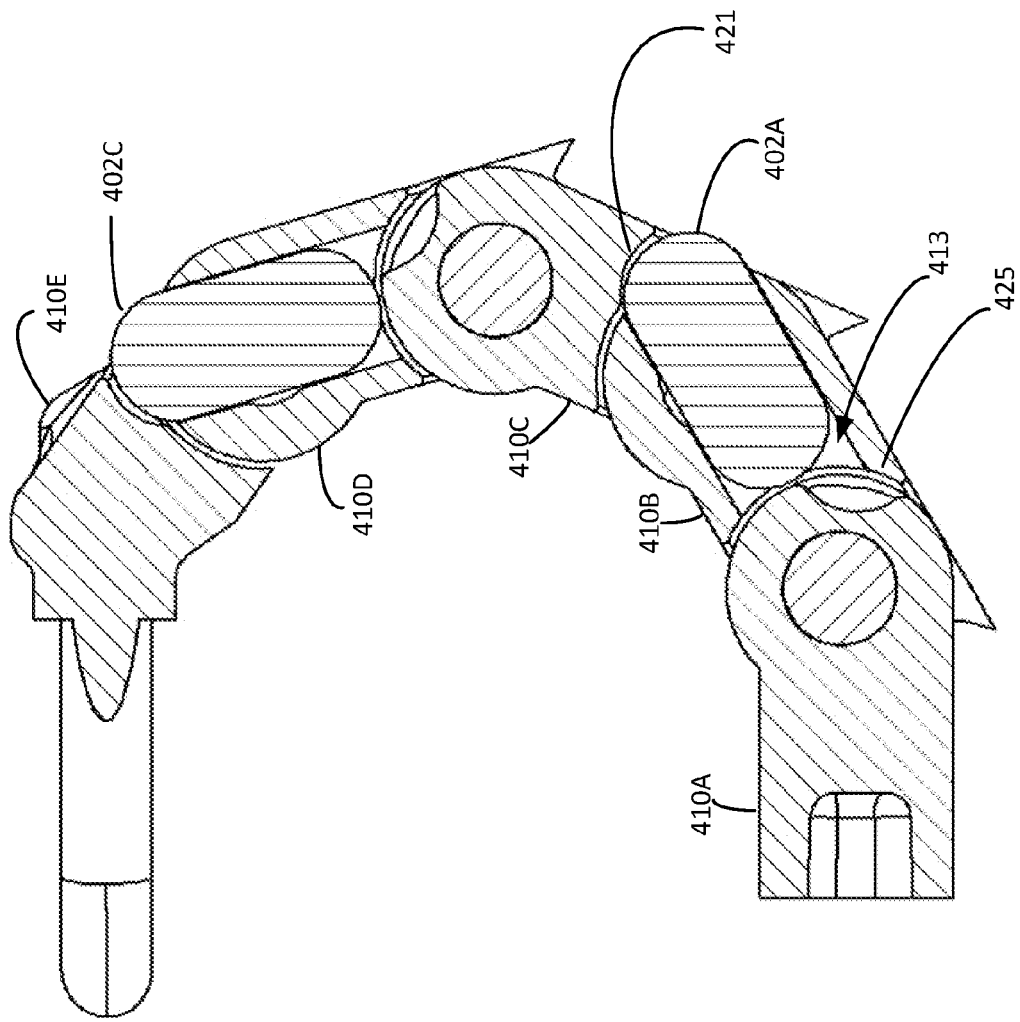
Figure 4J:
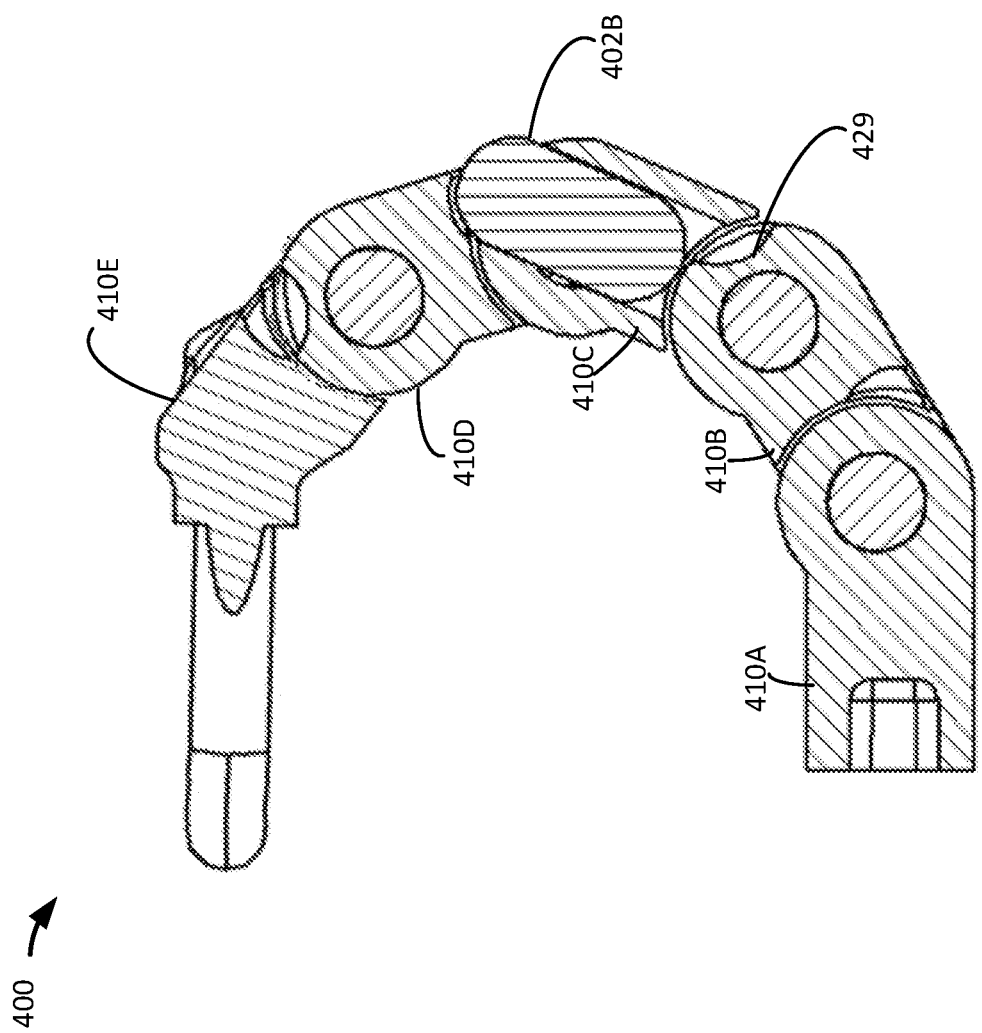
Figure 4K:
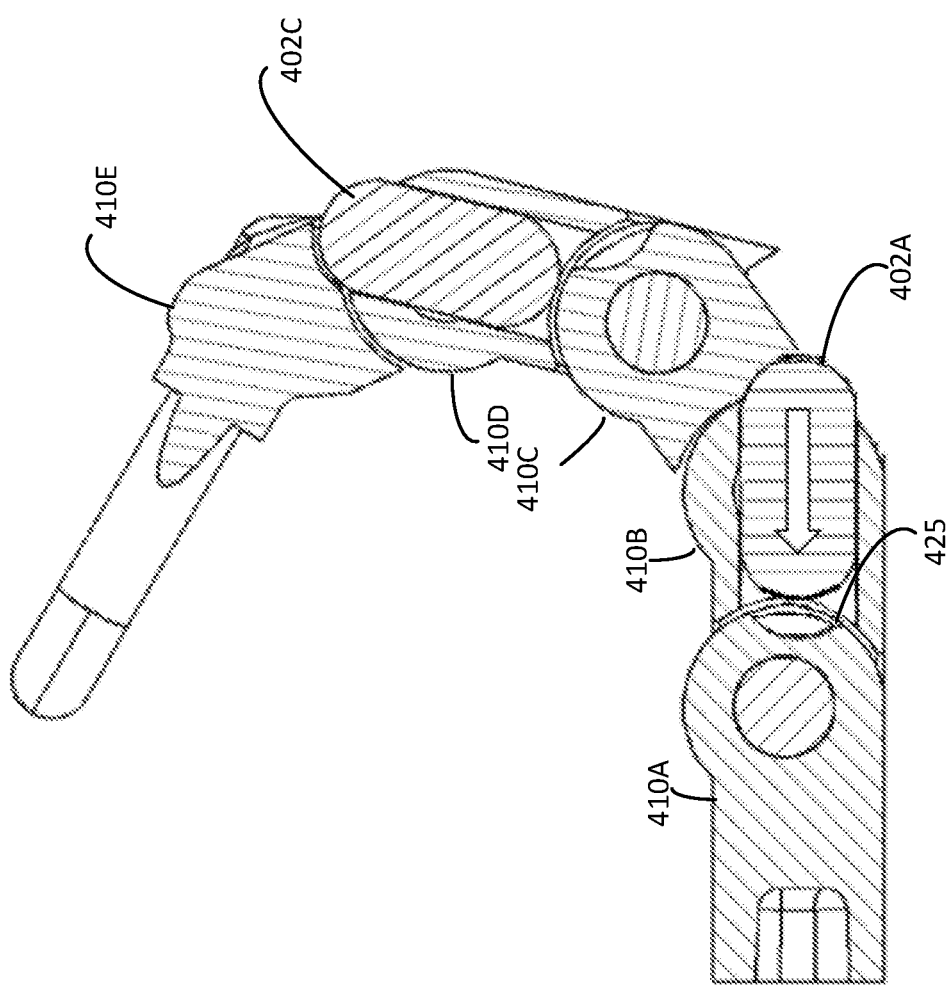
Figure 4M:
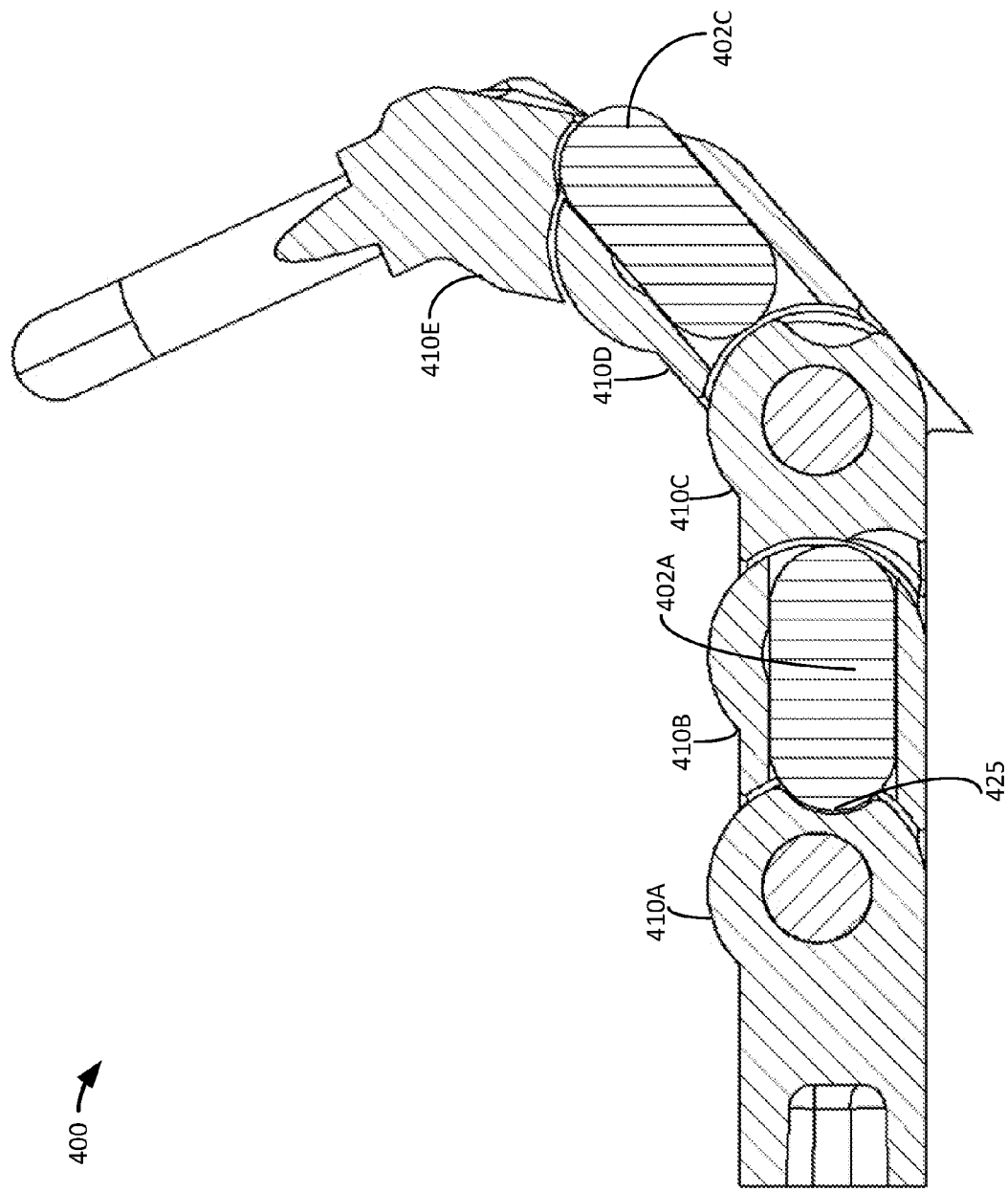
Figure 4N:
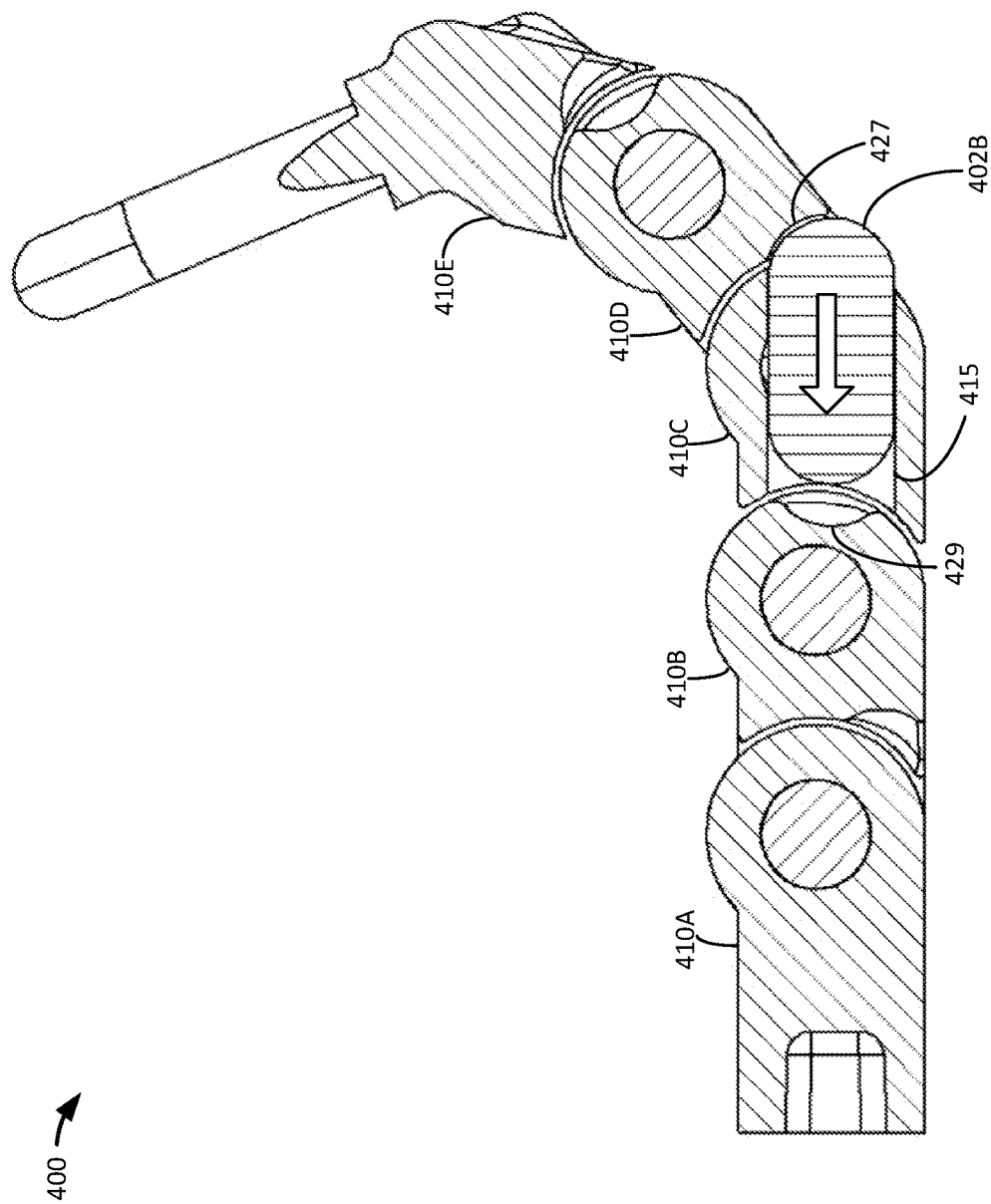
Figure 4P:
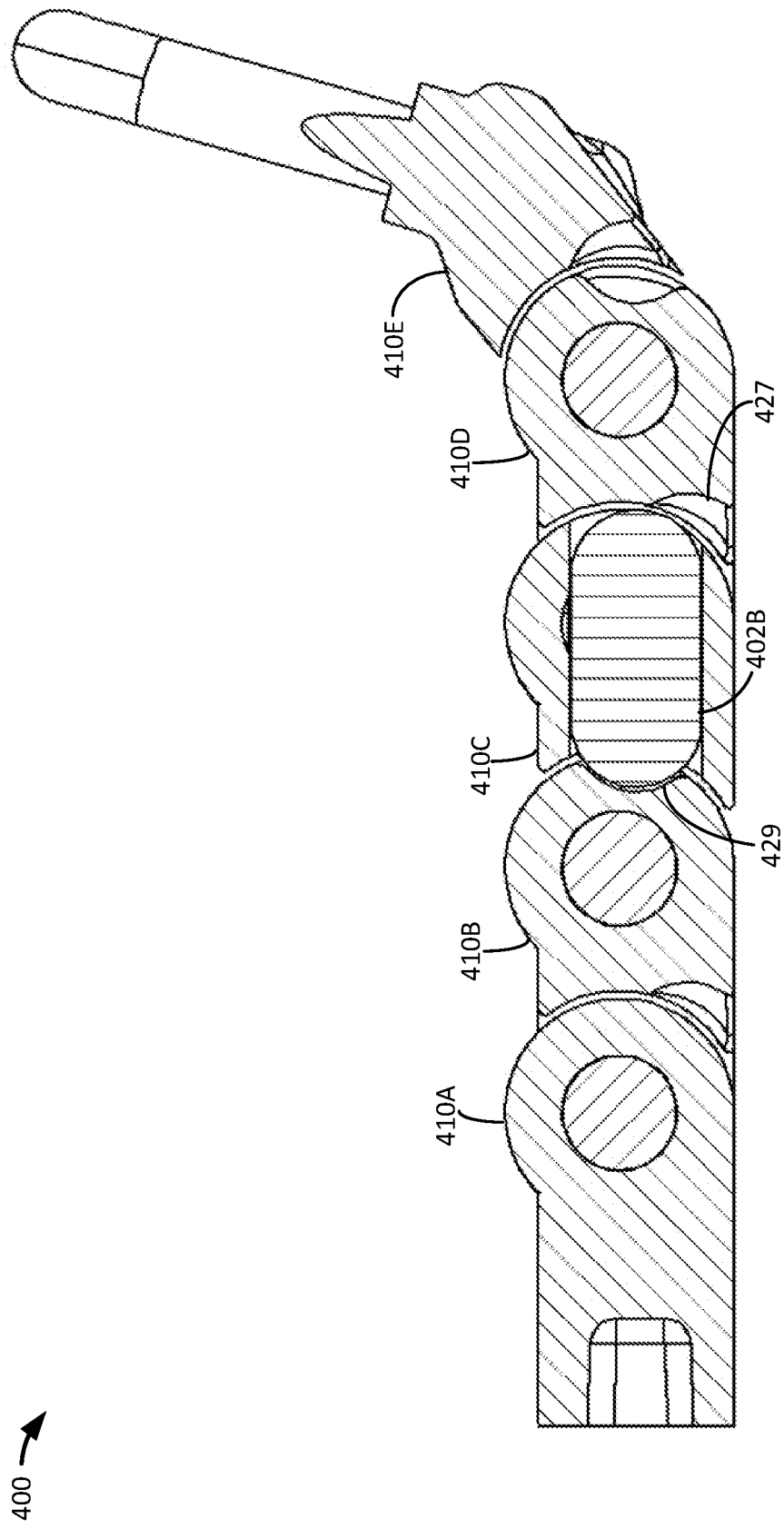
Figure 4Q:
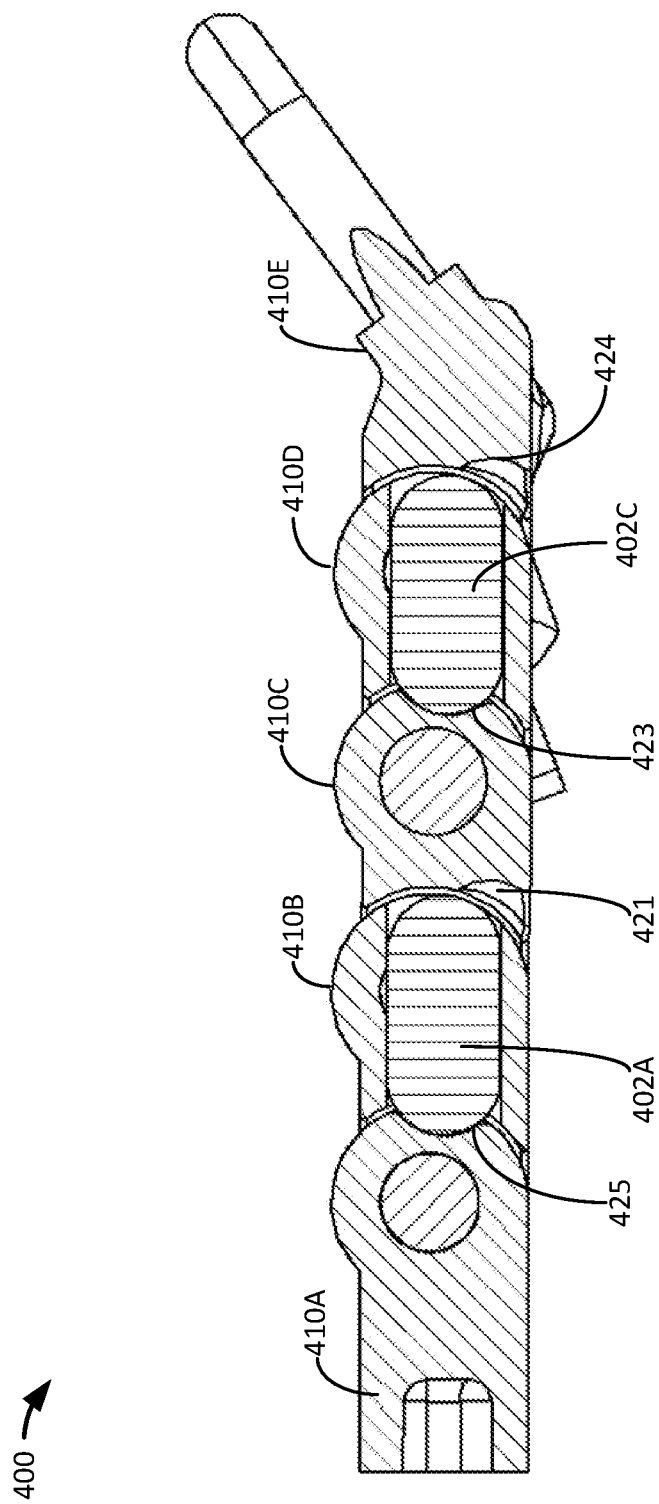
Figure 4R:
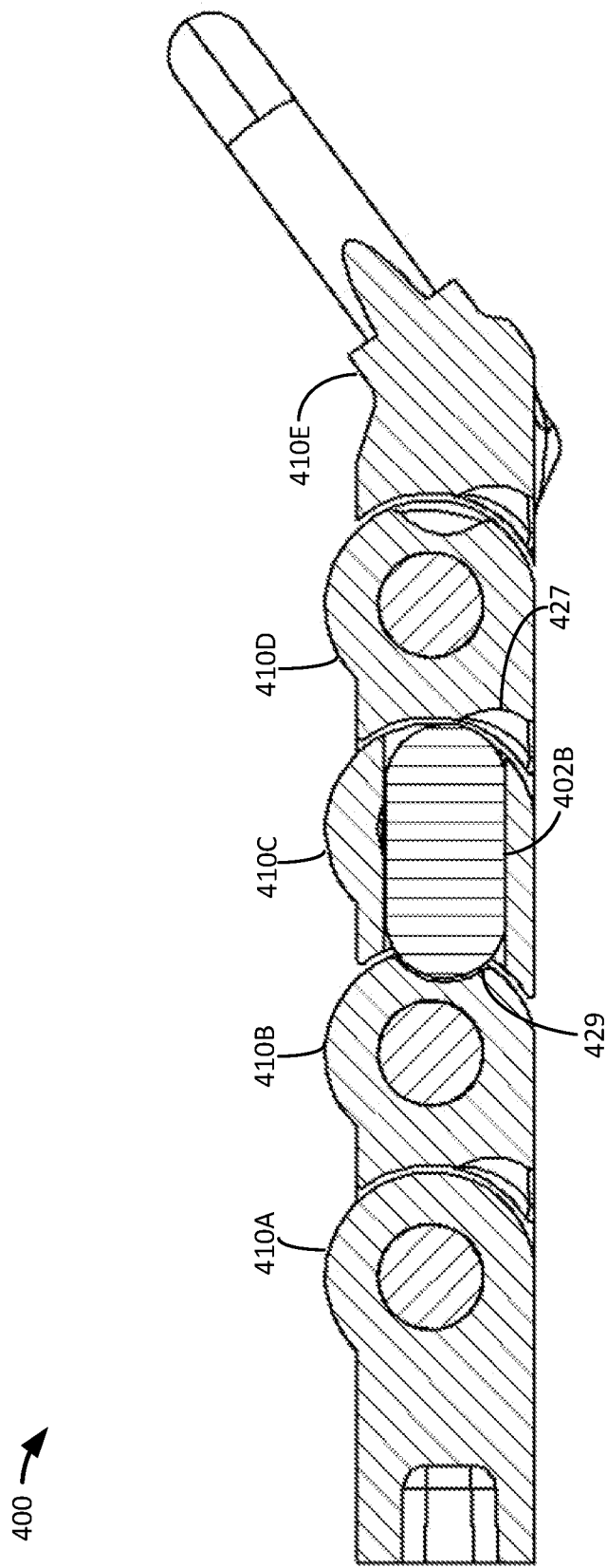

FIGS. 4A-4R illustrate sequencing pin position of a multi-pivot hinge assembly from open to closed position and again from closed to back open position. The sequencing pins may be configured to slide laterally within a slot formed near an end of a middle frame via a camming action between opposing cam surfaces of two frames that sandwich the middle frame to lock and unlock a frame and enable only one active hinge or pivot at a time For purposes of FIGS. 4A-4P, and as described in conjunction with FIG. 2B, two of the sequencing pins may be on the same side (e.g., a front side shown in FIGS. 4A, 4C, 4E, 4G, 4I, 4K, 4M, 4O, 4Q, and a backside shown in 4B, 4D, 4F, 4G, 4I, 4L, 4N, 4P, 4R) of the hinge assembly and a middle or third sequencing pin may be on the opposite side of the hinge assembly. FIGS. 4A, 4C, 4E, 4G, 4I, 4K, 4M, 4O, 4Q, show sequencing pin 402C configured to engage and disengage opposing cam surfaces on 410C and 410E by sliding within a slot 411 (as shown, for example, in FIG. 4A) formed on the end of frame 410D. FIGS. 4A, 4C, 4E, 4G, 4I, 4K, 4M, 4O, 4Q, 4R also show sequencing pin 402A configured to engage and disengage opposing cam surfaces on 410A and 410C by sliding within a slot 413 (as shown, for example, in FIG. 4A) formed on the end of frame 410B. FIGS. 4B, 4D, 4F, 4G, 4I, 4L, 4N, 4P, 4R show the back view to illustrate sequencing pin 402B configured to engage and disengage opposing cam surfaces on 410B and 410D by sliding within a slot 415 (as shown, for example, in FIG. 4B) formed on the end of frame 410C.

Additionally, for purposes of this description, the multi-pivot hinge assembly 400 may include overlapping hinge covers to cover each pivot hinge. Thus, there may be a receiver hinge cover covering receiving frame 410E and frame 410D, a third hinge cover covering frames 410C and 410D, a second hinge cover frames 410B and 410C, and a first hinge cover covering frames 410A and 410B.

With the hinge in a fully open position as shown in FIG. 4A, the receiver cover (not pictured) associated with frames 410E and 410D is the only pivot hinge enabled to rotate.

As shown in FIG. 4B, sequencing pin 402B is also locked in position by offset regions of opposing frames. Sequencing pin 402B is engaged in cam surface 429 to the left and is not able to translate to the right within a slot 415 to engage cam surface 427.

As shown in FIG. 4C, as the receiver frame 410E and receiver cover rotate counterclockwise, or in a closing direction, the cam surface 424 of frame 410E is exposed and the sequencing pin 402C is aligned with the exposed cam surface 424. The sequencing pin 402C may be enabled to translate in a horizontal plane within the slot 411 to disengage cam surface 423 of frame 410C. The translation of the sequencing pin 402C thereby unlocks the next cover, the third hinge cover for rotation.

As shown in FIG. 4D, sequencing pin 402B remains locked in position by offset regions of opposing frames (e.g., frames 410B and 410D) while the receiver cover rotates counterclockwise, and sequencing pin 402B remains engaged in cam surface 429 to the left and not able to translate within slot 415 to the right to engage cam surface 427.

As shown in FIG. 4E, the next hinge cover (e.g., the third hinge cover associated with frames 410D and 410C) may be able to rotate counterclockwise causing the sequencing pin 402C to translate in a horizontal plane within the slot 411. When the sequencing pin 402C translates to the right, the sequencing pin 402C engages the cam surface 424 and disengages cam surface 423 of frame 410C. When the sequencing pin 402C is engaged in cam surface 424, it cannot translate backward into cam surface 423, and locks rotation of the receiver cover.

FIG. 4F returns to the back view and illustrates that rotation of the third hinge cover exposes cam surface 427 of frame 410D enabling the sequencing pin 402B to disengage cam surface 429 to translate within slot 415 and engage cam surface 427. The translation of the sequencing pin 402B unlocks the next hinge cover (e.g., the second hinge cover associated with frames 410B and 410C) for rotation.

FIG. 4G returns to the front view, and shows that rotation of the second hinge cover in a counter clockwise direction which exposes cam surface 421 of frame 410C allowing the sequencing pin 402A to translate to the right to disengage cam surface 425 and engage cam surface 421. Rotation of the second hinge cover unlocks the first hinge cover and locks rotation of the third hinge cover.

FIG. 4H shows sequencing pin 402B after it has translated as described in FIG. 4F, to engage cam surface 427 in response to rotation of the second hinge cover. Rotation of the second hinge cover as described in FIG. 4G locks sequencing pin 402B in position such that it cannot translate back to engage cam surface 429. Rotation of the second hinge cover also locks rotation of the third hinge cover, and unlocks rotation of the next hinge cover, (e.g., the first hinge cover associated with frames 410A and 410B).

FIG. 4I illustrates that once pin 402B is locked into position as shown in FIG. 4G, frame 410B is unlocked for rotation of the first hinge cover (and frame 410A remains static). As the first hinge cover rotates, the sequencing pin 402A is fully translated and engaged in cam surface 421. Rotation of the first hinge cover locks rotation of the second hinge cover, as shown in FIG. 4I.

As shown in FIG. 4J, in rotation of the first hinge cover, deploys the multi-pivot hinge into the fully closed position.

The sequencing pins may also control the timing and order of each hinge of the multi-pivot hinge assembly from a closed to an open position.

FIG. 4K illustrates rotation of the first hinge cover in a clockwise direction to begin opening or unrolling the multi-pivot hinge assembly from a fully closed position. As shown in FIG. 4K, the first hinge cover is the only hinge cover able to rotate. As the first hinge cover rotates in the clockwise direction, the cam surface 425 of frame 410A is exposed to enable sequencing pin 402A to translate to the left.

FIG. 4L returns to a back view and illustrates that while the first hinge cover rotates enabling translation of sequencing pin 402A, the second hinge cover remains locked and sequencing pin 402B is locked in position, unable to translate.

FIG. 4M returns to a front view and illustrates that rotation of the first hinge cover enables sequencing pin 402A to engage cam surface 425 of frame 410A and unlocks rotation of the second hinge cover.

FIG. 4N illustrates rotation of the second hinge cover in the clockwise direction, which may expose cam surface 429 of frame 410B enabling sequencing pin 402B to translate towards the left to engage the cam surface 429 and disengage cam surface 427. Rotation of the second hinge cover unlocks rotation of the third hinge cover.

FIG. 4O illustrates rotation of the third hinge cover in the clockwise direction, which may expose cam surface 423 of frame 410C enabling sequencing pin 402C to translate towards the left to engage cam surface 423 and disengage cam surface 424. Rotation of the third hinge cover unlocks rotation of the receiver cover.

FIG. 4P returns to a back view to illustrate that rotation of the third hinge cover locks the second hinge cover by preventing the sequencing pin 402B from translating back to engage cam surface 427.

FIG. 4Q illustrates rotation of the receiver cover into the fully open position, where sequencing pin 402C is fully translated to the left engaged with cam surface 423. In the fully open position, sequencing pins 402A and 402B are engaged with cam surfaces 425 and 423 respectively, are prevented from translating to the right. Only the receiver cover is able to rotate in the fully open position.

FIG. 4R illustrates a back view of the multi-pivot hinge assembly showing that in the fully open position, the second hinge cover is also locked in position, and sequencing pin 402B is prevented from translating in either direction. As previously described, only the receiver cover is able to rotate while the multi-pivot hinge assembly is in the fully open position.

Figure 5:
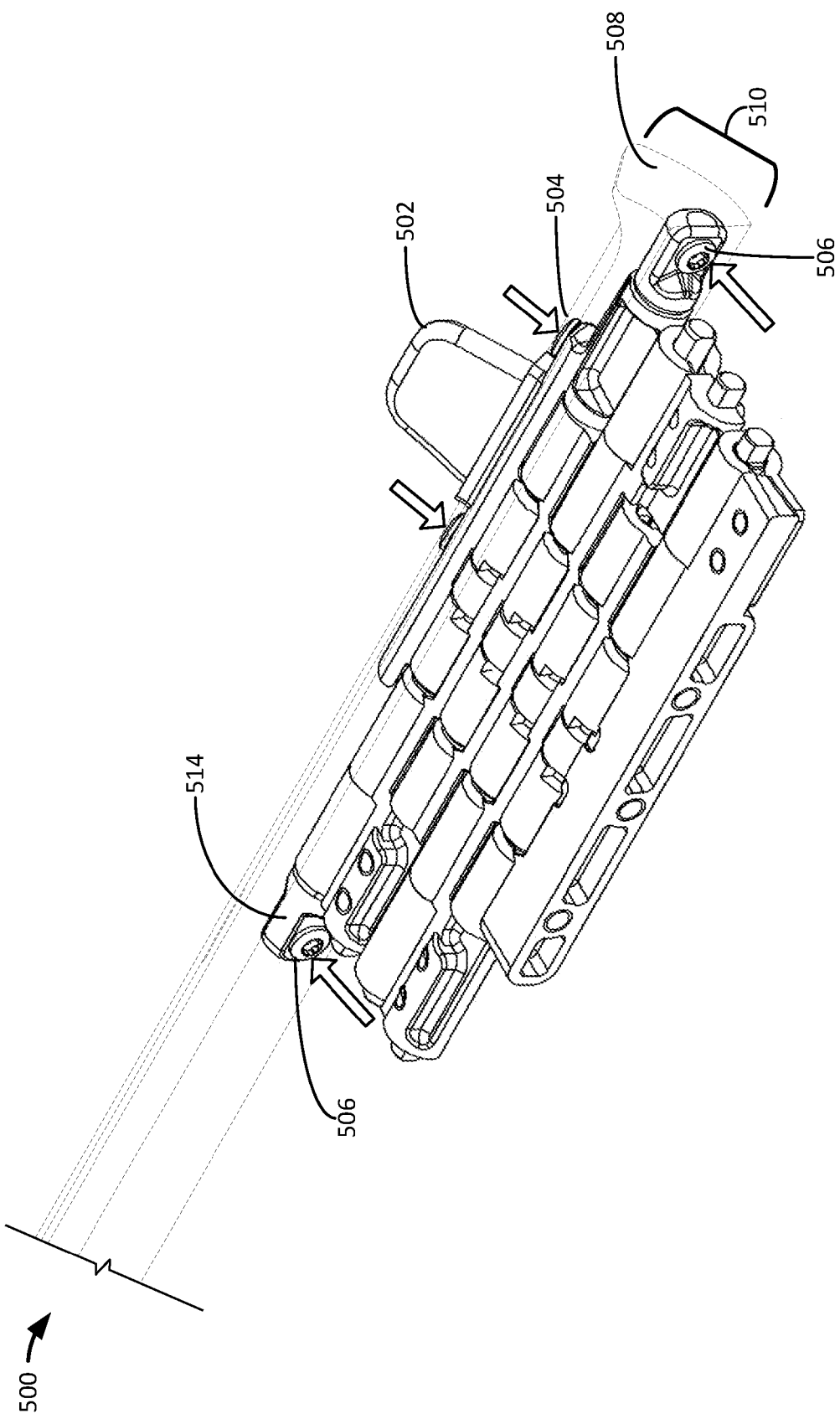
FIG. 5 illustrates an example fang integrated with a multi-pivot hinge assembly.

FIG. 5 illustrates an example fang integrated with a multi-pivot hinge assembly. A protrusion, or a fang 502 may be formed as part of a receiving frame 510 or the last frame of the multi-pivot hinge assembly 500, and a computing device, such as a tablet, may have a receptacle to engage the fang 502. In an example scenario, when the device is opened, a torque is applied, and a reaction force is experienced on the receiver cover 508. The reaction force is applied at the bottom edge of the receiver cover 508, and in some scenarios a bounce or wobble may be experienced. Integration of the fang 502 with the multi-pivot hinge assembly 500 by forming the fang 502 as part of the receiving frame 510 may increase stiffness of the device with the multi-pivot hinge assembly 500 and may reduce a wobble or bounce.

In an example, in order to increase a stability or stiffness, and to counteract the reaction force experienced at the receiver frame 510, a plurality of fasteners, such as threaded screws 504, may be integrated with the fang 502. A set of threaded holes can be added near the fang 502 that can accept the screws through holes in the corresponding receiver cover 508. The proximity of the screws 504 near the fang has a proportional effect on how much the receiver cover is relied upon for stiffness.

In a further example, an additional set of fasteners 506 may be integrated with the receiver cover 508 and the fang 502 in order to increase an overall stiffness or stability of the receiver cover 508. In this example, the additional set of fasteners 506 may be integrated with a set of removable couplers 514 engaged on a shaft adjacent to the receiver frame 510. The fasteners 506 may be inserted through holes of the removable couplers 514 to attach the couplers closest to the receiver cover over the receiver frame 510. Thus, the attached removable couplers 514 can put a preload on the receiver cover 508 to counteract a reaction force and provide additional stiffness.

In an example, composing the fang 502 and multi-pivot hinge assembly 502 from a material having a high modulus such as steel may increase the stiffness of the fang 502. Additionally, the hinge cover may be composed from other materials that have a lower modulus than steel, such as aluminum or magnesium.

The detailed description provided above in connection with the appended drawings is intended as a description of examples and is not intended to represent the only forms in which the present examples may be constructed or utilized.

Certain aspects of the invention provide the following non-limiting examples.

In an example, technologies are described for an integrated multi-pivot hinge assembly which may include a set of radially arranged sequential frames configured to rotate around individual frame axes, each frame of the set of radially arranged sequential frames including a plurality of kinematic components for controlling a degree of rotation about each frame axis, a set of rotational control elements interposed between adjacent frames, the set of rotational control elements configured to control a relative sequence of rotation of the individual sequential frames, and a set of friction components integrated with the set of radially arranged sequential frames, the friction components including one or more shafts configured to rotatably secure adjacent frames together defining the individual frame axes of adjacent frames.

In an example further to the above example, each individual frame of the radially arranged sequential frames includes opposing offset regions that fit with together with corresponding inset regions of an adjacent frame, and wherein each offset region includes a central opening that when individual adjacent frames are coupled together creates a passageway for the shaft.

In an example further to any of the above examples, the set of friction components includes a friction band attached to a first end of an inserted shaft.

In an example further to any of the above examples, the set of friction components includes a set of removable couplers configured to attach to each exposed end of an inserted shaft.

In an example further to any of the above examples, the shaft is shaped in a unique profile and matches a unique profile shape of the passageway created by coupled adjacent frames.

In an example further to any of the above examples, the plurality of kinematic components comprises coordinating rotational limiting surfaces on adjacent frames that are configured to engage with each other to limit a degree of rotation about each individual frame axis to a predefined number of degrees.

In an example further to any of the above examples, the rotational control elements comprise a plurality of sequencing pins, each sequencing pin configured to engage concave and convex cam surfaces defined on adjacent sequential frames.

In an example further to any of the above examples, a relative position of an individual sequencing pin relative to first and second cam surfaces on adjacent sequential frames determines whether a frame can rotate relative to an adjacent frame.

In an example further to any of the above examples, the rotational control elements prevent rotation about an individual hinge axis until an adjacent hinge axis has completed a defined number of degrees of rotation.

In an example further to any of the above examples, when a first rotational control element is engaged enabling rotation of adjacent sequential frames, the remaining sequential frames are prohibited from rotating.

In an example, technologies are also described for a computing device, which includes a first portion and a second portion, and an integrated multi-pivot hinge assembly rotatably securing the first portion to the second portion enabling transition from a fully open position to a fully closed position, the hinge assembly comprising a set of radially arranged sequential frames configured to rotate around individual frame axes, each frame including a plurality of kinematic components for controlling a degree of rotation about each frame axis, a set of rotational control elements interposed between adjacent frames, the set of rotational control elements configured to control a relative sequence of rotation of the individual sequential frames, and a set of friction components integrated with the set of radially arranged sequential frames configured to rotatably secure adjacent frames together and defining the individual frame axes of adjacent frames.

In an example further to the above example, the first portion includes a display screen and the second portion includes an input device.

In an example further to any of the above examples, each individual frame of the radially arranged sequential frames includes opposing offset regions that fit with together with corresponding inset regions of an adjacent frame, and wherein each offset region includes a central opening that when individual adjacent frames are coupled together creates a passageway for the shaft.

In an example further to any of the above examples, the set of friction components includes one or more shafts configured to be inserted through one or more passageways of coupled adjacent frames, one or more friction bands engaged with at least one end of an inserted shaft and one or more removable couplers configured to be attached to at least one end of the inserted shaft.

In an example further to any of the above examples, the plurality of kinematic components comprises coordinating rotational limiting surfaces on adjacent frames configured to engage to limit a degree of rotation about each individual frame axis to a predefined number of degrees.

In an example further to any of the above examples, the set of rotational control elements include a set of rotational sequencing pins. In an example further to any of the above examples, the set of rotational sequencing pins are configured to engage concave and convex cam surfaces defined on adjacent sequential frames, and wherein a relative position of an individual sequencing pin relative to first and second cam surfaces on adjacent sequential frames determines whether a frame can rotate relative to an adjacent frame.

In an example further to any of the above examples, the rotational control elements prevent rotation about an individual hinge axis until an adjacent hinge axis has completed a defined number of degrees of rotation.

In an example, technologies are described for an integrated multi-pivot hinge assembly comprising a set of radially arranged sequential frames configured to rotate around individual frame axes, each frame including a plurality of kinematic components for controlling a degree of rotation about each frame axis, a set of rotational control elements interposed between adjacent frames, the set of rotational control elements configured to control a relative sequence of rotation of the individual sequential frames, a set of friction components integrated with the set of radially arranged sequential frames, the friction components including one or more shafts configured to rotatably secure adjacent frames together defining the individual frame axes of adjacent frames, and a fang protrusion configured to attach the hinge assembly to a computing device via a receiving receptacle of the computing device.

In an example further to any of the above examples, the fang protrusion extends from an end frame of the set of radially arranged sequential frames, and wherein the fang protrusion includes a plurality of threaded holes configured to accept a plurality of screws to secure a hinge cover to the end frame.

In an example further to any of the above examples, the multi-pivot hinge assembly includes a plurality of screws configured to secure a hinge cover to the end frame via a plurality of threaded holes located adjacent to the fang protrusion and aligned with a plurality of threaded holes formed in the hinge cover when the hinge cover is in place over the end frame.

In an example further to any of the above examples, the fang protrusion is composed from steel.

In an example further to any of the above examples, the multi-pivot hinge assembly includes a plurality of screws configured to secure a hinge cover to the end frame via removable couplers integrated with the set of friction components associated with the sequential frames.

It is to be understood that the configurations and/or approaches described herein are examples, and that the described embodiments, implementations and/or examples are not to be considered in a limiting sense, because numerous variations are possible. The specific processes or methods described herein may represent one or more of any number of processing strategies. As such, various operations illustrated and/or described may be performed in the sequence illustrated and/or described, in other sequences, in parallel, or omitted. Likewise, the order of the above-described processes may be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. An integrated multi-pivot hinge assembly comprising:
a set of two or more sequential frames;
a set of one or more shafts, wherein adjacent sequential frames of said two or more sequential frames are connected by an individual shaft of the one or more shafts, the individual shaft configured to be inserted through a central opening created by opposing offset regions of the adjacent sequential frames to pivotally connect the adjacent sequential frames and to define an individual frame axis for the adjacent sequential frames, each frame of the set of two or more sequential frames including a plurality of rotational limiting surfaces, the plurality of rotational limiting surfaces configured to control a degree of rotation about each corresponding frame axis by prohibiting axial rotation of a sequential frame of the set of two or more sequential frames about its corresponding individual frame axis when the rotational limiting surfaces of adjacent frames are in contact; and
a set of rotational control elements interposed between the adjacent sequential frames of the set of two or more sequential frames, the set of rotational control elements comprising a set of sequencing pins configured to translate between and engage opposing concave and convex cam surfaces defined on the adjacent sequential frames, wherein a relative position of an individual sequencing pin of the sequencing pins relative to the opposing concave and convex cam surfaces on the adjacent sequential frames determines whether a frame can rotate relative to an adjacent frame.

2. The hinge assembly of claim 1, wherein further comprising a set of friction components, the set of friction components includes a friction band wrapped around at least one end of each shaft of the one or more shafts.

3. The hinge assembly of claim 1, further comprising one or more removable couplers configured to attach to an exposed end of each shaft of the one or more shafts.

4. The hinge assembly of claim 1, wherein a cross section of the shaft is shaped in a unique profile and matches a unique profile shape of at least one central opening of the opposing offset regions of the adjacent sequential frames.

5. The hinge assembly of claim 1, wherein the plurality of rotational limiting surfaces comprises coordinating rotational limiting surfaces on adjacent frames configured to come in contact with each other to limit a degree of rotation about each individual frame axis to a predefined number of degrees.

6. The hinge assembly of claim 1, wherein the rotational control elements prevent rotation about one individual frame axis until an adjacent individual frame axis has completed a defined number of degrees of rotation.

7. The hinge assembly of claim 6, wherein when one of the rotational control elements is in a position to freely translate between the adjacent sequential frames enabling rotation of the adjacent sequential frames, the remaining sequential frames are prohibited from rotating.

8. A computing device, comprising;
a first portion and a second portion; and
an integrated multi-pivot hinge assembly rotatably securing the first portion to the second portion and enabling transition from a fully open position to a fully closed position, the integrated multi-pivot hinge assembly comprising:
a set of two or more sequential frames;
a set of one or more shafts, wherein adjacent sequential frames of said two or more sequential frames are connected by an individual shaft of the one or more shafts, the individual shaft configured to be inserted through a central opening created by opposing offset regions of the adjacent sequential frames to pivotally connect the adjacent sequential frames and to define an individual frame axis for the adjacent sequential frames, each frame of the set of two or more sequential frames including a plurality of rotational limiting surfaces, the plurality of rotational limiting surfaces configured to control a degree of rotation about each corresponding frame axis by prohibiting axial rotation of a sequential frame of the set of two or more sequential frames about its corresponding individual frame axis when the rotational limiting surfaces of adjacent frames are in contact; and
a set of rotational control elements interposed between the adjacent sequential frames of the set of the two or more sequential frames, the set of rotational control elements comprising a set of sequencing pins of the sequencing pins configured to translate between and engage opposing concave and convex cam surfaces defined on the adjacent sequential frames, wherein a relative position of an individual sequencing pin relative to the opposing concave and convex cam surfaces on the adjacent sequential frames determines whether a frame can rotate relative to an adjacent frame.

9. The computing device of claim 8, wherein the first portion includes a display screen and the second portion includes an input device.

10. The computing device of claim 8, further comprising one or more friction bands wrapped around at least one end of each shaft of the one or more shafts and one or more removable couplers configured to be attached to at least one end of each shaft of the one or more shafts.

11. The computing device of claim 8, wherein the plurality of rotational limiting surfaces comprises coordinating rotational limiting surfaces on adjacent frames configured to come in contact to limit a degree of rotation about each individual frame axis to a predefined number of degrees.

12. The computing device of claim 8, wherein a cross section of each shaft is shaped in a unique profile and matches a unique profile shape of at least one central opening of the opposing offset regions of the adjacent sequential frames.

13. An integrated multi-pivot hinge assembly comprising:
a set of two or more sequential frames;
a set of one or more shafts, wherein adjacent sequential frames of said two or more sequential frames are connected by an individual shaft of the one or more shafts, the individual shaft configured to be inserted through a central opening created by opposing offset regions of the adjacent sequential frames to pivotally connect the adjacent sequential frames and to define an individual frame axis for the adjacent sequential frames, each frame of the set of two or more sequential frames including a plurality of rotational limiting surfaces, the plurality of rotational limiting surfaces configured to control a degree of rotation about each frame axis by prohibiting axial rotation of a sequential frame of the set of two or more sequential frames about its corresponding individual frame axis when the rotational limiting surfaces of adjacent frames are in contact;
a set of rotational control elements interposed between the adjacent sequential frames of the set of two or more sequential frames, the set of rotational control elements comprising a set of sequencing pins configured to translate between and engage opposing concave and convex cam surfaces defined on the adjacent sequential frames, wherein a relative position of an individual sequencing pin of the sequencing pins relative to the opposing concave and convex cam surfaces on the adjacent sequential frames determines whether a frame can rotate relative to an adjacent frame;
at least one friction band wrapped around at least one end of each shaft of the one or more shafts; and
a fang protrusion configured to attach the integrated multi-pivot hinge assembly to a computing device via a receiving receptacle of the computing device.

14. The hinge assembly of claim 13, wherein the fang protrusion extends from an end frame of the set of two or more sequential frames, and wherein the fang protrusion includes a plurality of threaded holes configured to accept a plurality of screws to secure a hinge cover to the end frame.

15. The hinge assembly of claim 13, further comprising a plurality of screws configured to secure a hinge cover to an end frame of the set of two or more sequential frames via a plurality of threaded holes located adjacent to the fang protrusion and aligned with a plurality of threaded holes formed in the hinge cover when the hinge cover is in place over the end frame.

16. The hinge assembly of claim 13, further comprising:
one or more removable couplers configured to be attached to at least one end of each shaft of the one or more shafts.

\* \* \* \* \*